(12) United States Patent
Love et al.

(10) Patent No.: US 6,502,328 B1
(45) Date of Patent: Jan. 7, 2003

(54) SEAL FOR HOLDING A MICROWAVE ANTENNA AT A PRESSURIZED TANK OF A GAS DRYING SYSTEM AND METHOD

(75) Inventors: Wayne G. Love, Glen Ellyn, IL (US); Clyde R. Kerns, Midlothian, IL (US); Stephen B. Ciotti, Lake Zurich, IL (US)

(73) Assignee: Arrow Pneumatics, Inc., Broadview, IL (US)

( * ) Notice: Subject to any disclaimer, the term of this patent is extended or adjusted under 35 U.S.C. 154(b) by 0 days.

(21) Appl. No.: 09/573,108

(22) Filed: May 17, 2000

(51) Int. Cl.⁷ ............................. F26B 3/34; B01D 53/04
(52) U.S. Cl. ................. 34/473; 34/81; 34/265; 219/748; 219/121.22; 95/99; 95/105; 95/122; 95/126; 96/144; 343/878
(58) Field of Search ......................... 34/259, 264, 265, 34/80, 81, 473; 219/690, 748, 761, 121.21, 121.22; 95/97, 98, 99, 104, 105, 106, 119, 120, 121, 122, 123, 124, 125, 126; 96/127, 130, 133, 143, 144; 343/762, 771, 772, 878, 888

(56) References Cited

U.S. PATENT DOCUMENTS

| | | | | |
|---|---|---|---|---|
| 4,805,317 A | * | 2/1989 | Inglis et al. | 34/259 |
| 5,429,665 A | * | 7/1995 | Botich | 95/99 |
| 5,495,218 A | * | 2/1996 | Erb et al. | 333/248 |
| 5,581,903 A | * | 12/1996 | Botich | 34/264 |
| 5,872,494 A | * | 2/1999 | Palan et al. | 333/252 |
| 6,114,811 A | * | 9/2000 | Wu | 315/111.21 |
| 6,424,307 B1 | * | 7/2002 | Nutt | 343/741 |

* cited by examiner

Primary Examiner—Pamela Wilson
(74) Attorney, Agent, or Firm—Thomas J. Ring; Wildman, Harrold, Allen & Dixon

(57) ABSTRACT

A seal for an opening defined by a sidewall portion of the pressurizable tank. The tank contains desiccant for drying gases which pass through the desiccant. An elongate antenna extends from an interior portion to an exterior portion of the tank and is used for carrying microwave energy to the desiccant for regeneration of the desiccant. The seal has an insulator with an interior surface for receiving engagement with the antenna at the opening of the tank. In one embodiment, the interior surface of the insulator is tapered such that a distance between opposing portions of the insulator reduces as the insulator extends in a direction through the opening toward the exterior of the tank. The antenna has a cross sectional dimension which reduces in size as the antenna extends in the direction through the opening toward the exterior of the tank. The insulator has an external surface which is positioned between the interior surface of the insulator and the sidewall portion of the pressurizable tank which defines the opening of the tank.

203 Claims, 7 Drawing Sheets

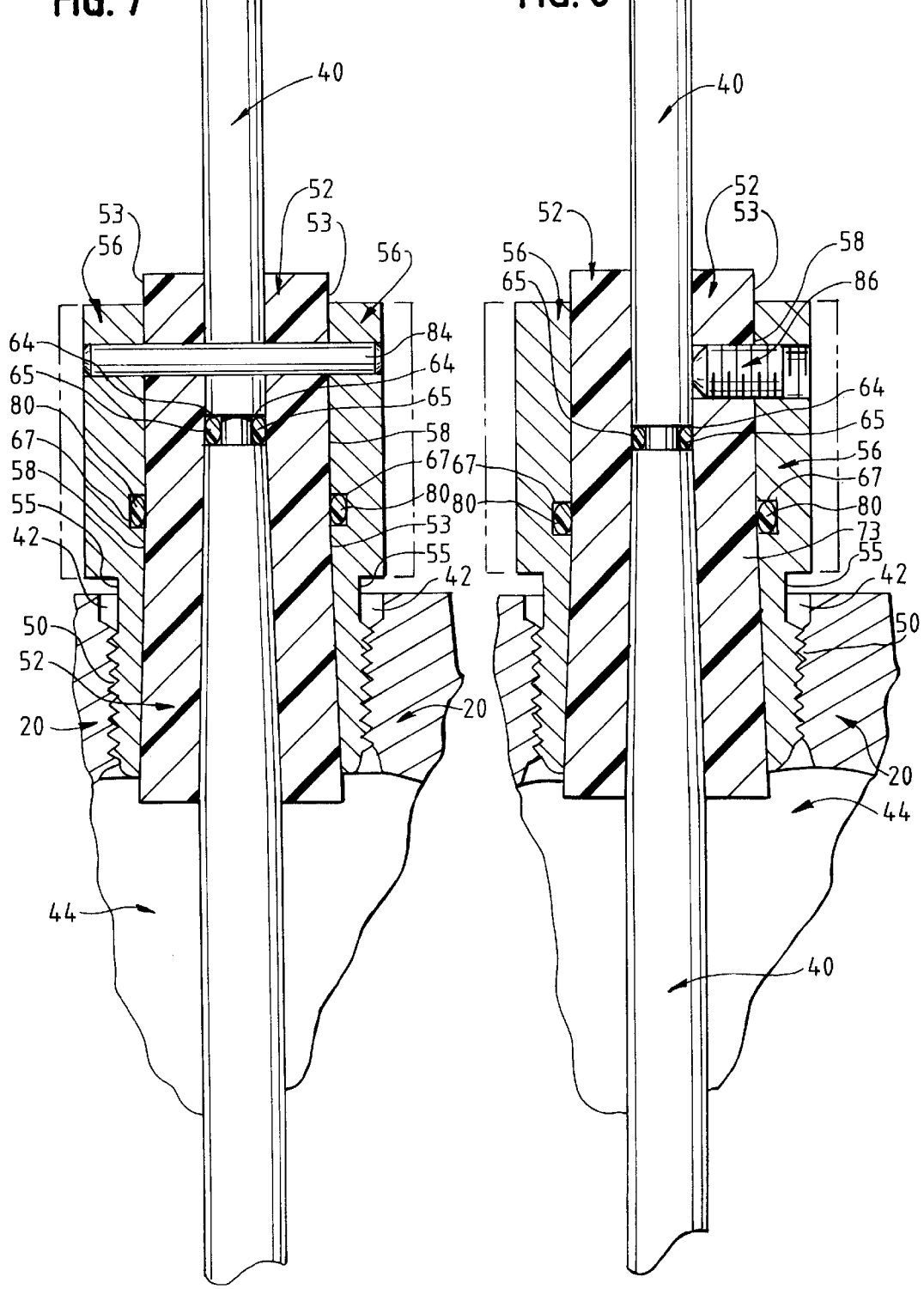

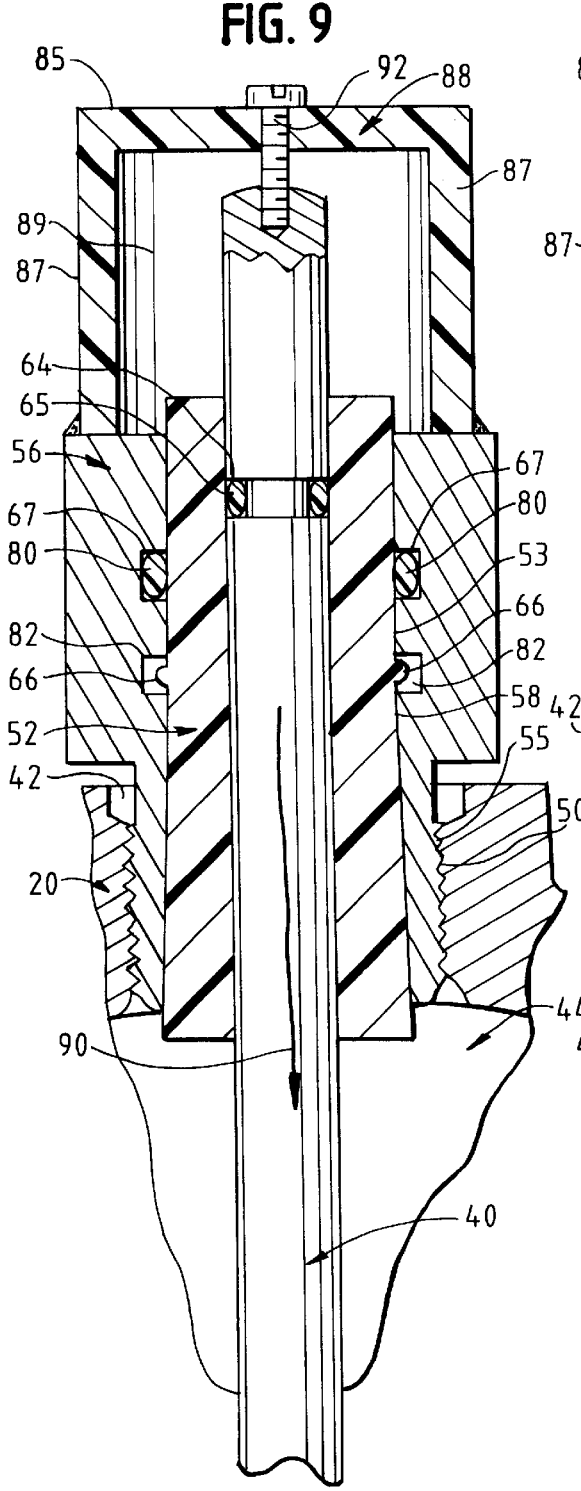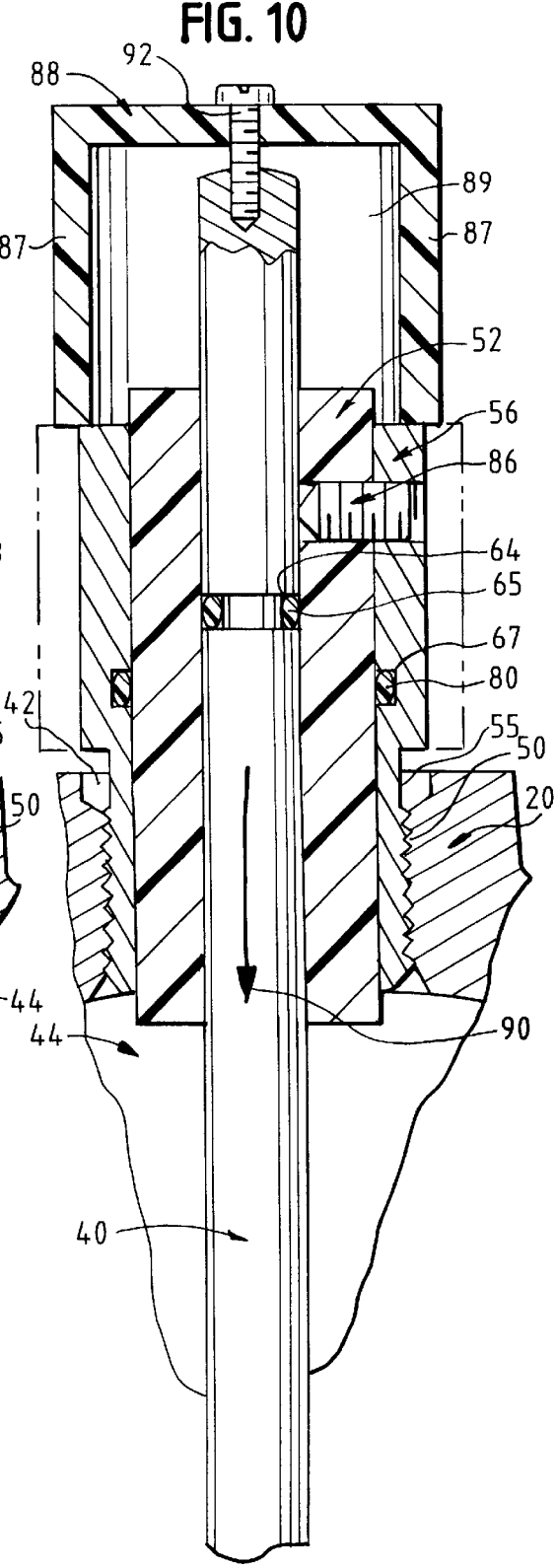

SEAL FOR HOLDING A MICROWAVE ANTENNA AT A PRESSURIZED TANK OF A GAS DRYING SYSTEM AND METHOD

FIELD OF THE INVENTION

The invention relates generally to seals for gas drying systems having a tank which contains pressurized gas, and more particularly, to a seal which holds an elongate antenna at an opening of the pressurized tank in a gas drying system which utilizes microwave energy for the regeneration of desiccant contained in the tank.

BACKGROUND OF THE INVENTION

Drying devices which receive a wet gas under pressure such as air containing a high level of moisture are well known. These gas drying devices are commonly used in many industrial applications such as spray painting, pneumatic control systems and air operated equipment. It is also known in such devices to utilize a desiccant such as activated alumina, carbons, silica gels or molecular sieves located in a tank to adsorb and remove the moisture from the wet air which is inserted under pressure at an inlet and is carried to another end of the tank. Such air drying devices frequently use a portion of the dried air also called a purge gas from one desiccant tank or chamber that is drying air to regenerate the desiccant in another tank that has already removed moisture from the wet air earlier.

These known regenerative dryers (either heated or heatless) use a dual tank or dual chamber system in which wet gas is received through an inlet at the top of one of the tanks. One tank performs a gas drying function while another tank of the system operates to regenerate previously saturated desiccant. The dual chamber/tank systems have both tanks interconnected with each other. Additionally, both tanks are interdependent in that the tanks both work together to shift between regenerative and gas drying cycles. Once the desiccant in one tank drying the wet gas is sufficiently saturated during the gas drying cycle and the desiccant in the other tank is dried out during the regeneration cycle, the cycles are reversed by flipping diverter valves interposed between the two tanks. Dry purge gas received from the other tank drying wet air is, in turn, used to dry and regenerate the saturated desiccant in the one tank. These drying systems are cycled back and forth requiring the use of two tanks to dry out the wet gases and regenerate desiccant.

Certain gas drying systems use microwave energy to activate and regenerate the desiccant material in the tank. A microwave generating device, such as magnetron, is used to generate microwaves which are carried within a waveguide to an antenna disposed within the waveguide. The microwaves are carried along the length of the antenna which extends through an opening and into the tank. The microwave energy transmitted via the antenna, that is partially immersed in the desiccant, is used to regenerate the saturated desiccant within the tank.

In these tanks which utilize microwave energy for desiccant regeneration, an insulative bushing member positioned through an opening of the tank has been used in an effort to hold the antenna in place. Disadvantageously, at times the antenna has slipped out of its initially set position upon pressurization/depressurization of the tank during gas drying and desiccant regeneration cycles. Such movement of the antenna can occur especially during changeover from the regeneration cycle to the gas drying cycle in which the tank operates at 25–400 (generally 100–200) pounds per square inch (psi). It has been found that when the pressure is lowered in the tank the antenna has a tendency to move down into the tank and when the tank is highly pressurized (during the drying cycle) the antenna and the insulative bushing member have a tendency to move up (or even out) toward the exterior of the tank. Movement of the antenna from its originally set position can also cause arcing and/or poor energy transfer when utilizing microwave energy for desiccant regeneration. Disadvantageously, arcing can cause significant temperature increases which may result in melting of a bushing member. Accordingly, there is a need for a seal for pressurized gas drying tanks which reduces the affects of arcing while adequately maintaining the position of a microwave antenna during gas drying and desiccant regeneration cycles.

SUMMARY OF THE INVENTION

One or more of the problems noted above are solved in accordance with the present invention by a seal for holding in place an antenna which passes through an opening of a pressurized tank containing desiccant material. In one aspect of the invention, the seal arrangement uses a shaped insulator to transition the impedance of the microwaves. A mechanical arrangement is provided to prevent the pressure inside the tank from pushing the seal out through the tank opening. Alternative embodiments involve channel and tab snap together components. The invention allows for simple assembly which limits microwave losses while retaining the relative positioning of the antenna and seal components with or without positive pressure inside the tank.

BRIEF DESCRIPTION OF THE DRAWINGS

FIG. 7 is a cross sectional view of another embodiment of a seal arrangement and securement member of the present invention;

FIG. 8 is a cross sectional view of another embodiment of a seal arrangement and securement member of the present invention;

FIG. 9 is a cross sectional view illustrating another embodiment of the securement member of the arrangement of FIG. 8;

FIG. 10 is a cross sectional view illustrating another embodiment of a seal arrangement and securement member of the present invention;

DETAILED DESCRIPTION

Figure 1A:
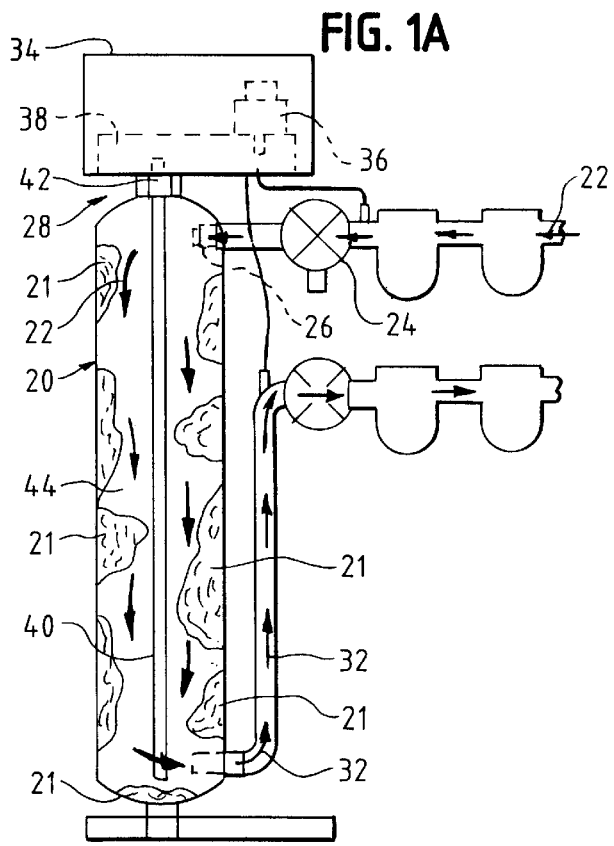
FIG. 1A is a schematic of a tank containing desiccant for drying wet gas.

Stated generally, a seal for an opening defined by a wall portion of a pressurizable tank, in which the tank contains desiccant for drying a gas passed through the desiccant is provided having an elongate antenna for carrying microwave energy to the desiccant for regeneration of the desiccant with the antenna extending from an interior portion of the tank through the opening to an exterior portion of the tank. An insulator having an interior surface is provided for receiving engagement with the antenna proximate the opening of the tank. The interior surface of the insulator defines a shape such that a distance between opposing portions of the interior surface of the insulator reduces as the insulator extends in a direction through the opening toward the exterior of the tank for receiving engagement with the antenna. The position of the antenna which engages the interior surface of the insulator has a cross section dimension which reduces in size as the antenna extends in the direction through the opening toward the exterior of the tank. Additionally, the external surface of the insulator is positioned between the interior surface of the insulator and the wall portion of the pressurizable tank which defines the opening of the tank.

In an alternative embodiment, a seal for the opening defined by the wall portion of the pressurizable tank containing desiccant is provided having an insulator with an interior surface for receiving engagement with a portion of the antenna proximate the opening of the tank. A channel is placed in communication with the antenna and the interior surface of the insulator, and a gasket is positioned within the channel such that the gasket engages the antenna and the interior surface of the insulator with the antenna engaging the interior surface of the insulator.

The present invention encompasses a seal for the opening of the pressurizable tank with an insulator having an interior surface which defines an open space for receiving engagement with the antenna at the opening of the tank. A fitting member is used for engagement about the external surface of the insulator. The fitting member has an internal surface which defines another open space for receiving engagement with the external surface of the insulator member. The fitting member also has an exterior surface for securing engagement with the wall portion of the pressurizable tank which defines the tank opening. A channel is provided which is in communication with the internal surface of the fitting member and the external surface of the insulator. Additionally, a gasket is positioned within the channel such that the gasket engages the external surface of the insulator and the internal surface of the fitting member.

Yet another embodiment of the invention encompasses a seal for the pressurizable tank in which an insulator is provided for engagement about the circumference of the antenna at a position along the antenna at the opening of the tank. The insulator has its interior surface engaging the antenna and an external surface which engages a fitting member. The fitting member has its internal surface engaging the external surface of the insulator and the fitting member has its exterior surface securably engaging with the wall portion of the pressurizable tank which defines the opening of the tank. A bracket secured to the antenna is also provided to prevent movement of the antenna in the direction toward the interior of the tank.

In another embodiment of the seal for the pressurizable tank containing desiccant for drying gas which is passed through the desiccant and having an antenna projecting through the opening from an interior portion tank to an exterior position of the tank, an insulator having its interior surface engaging the antenna at the opening of the tank is provided. A fitting member with an internal surface is provided for engagement about the external surface of the insulator. The fitting member also having its exterior surface securably engaging the wall portion of the pressurizable tank which defines the opening of the tank. This arrangement includes a recess defined by one of (a) a surface of the antenna, and (b) the interior surface of the insulator. A tab extending from the other of (a) the surface of the antenna, and (b) the interior surface of the insulator which defines the recess, is provided with the tab positioned within the recess to secure the insulator to the antenna.

Referring now to FIG. 1A, tank 20 which contains desiccant 21 for drying wet gas 22 is shown in a gas drying mode of operation. As seen in FIG. 1A, the wet gas 22 is passed through valve 24 to a port 26 proximate a top area 28 of the tank 20. The wet gas 22 migrates down through the tank 20 and is passed under pressure in the tank into communication with activated desiccant stored in the tank. The desiccant 21 may selectively be activated alumina, carbons, silica gels, molecular sieves and the like. The activated desiccant 21 dries the wet gas 22 as it moves through the tank 20 to create a dry gas 30 which exits through port 32 proximate the bottom of the tank. The dry gas 22 may selectively be utilized in various industrial applications. As seen in FIG. 1A, a power head unit 34 having a microwave generating device 36 (such as a magnetron) for transmitting microwave energy through a waveguide 38 is mounted proximate the top area 28 of the tank 20. An elongate antenna 40 extends through an opening 42 proximate the top area 28 of the tank 20 between the waveguide 38 and the interior region 44 of the tank which contains the desiccant. The elongate antenna 40 extends substantially the length of the interior 44 of the tank 20 for the transmission of microwave energy to the desiccant 21 during the regulation cycle. The microwave generating device 36, however, is not activated and does not transmit microwaves to the antenna 40 during the gas drying cycle as shown in FIG. 1A.

Figure 1B:
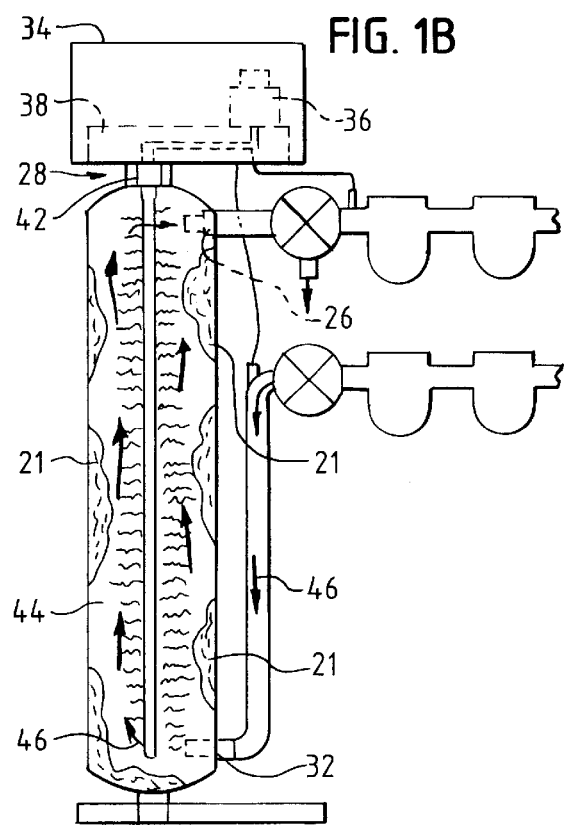
FIG. 1B is a schematic of the tank during a regeneration cycle in which the desiccant is being dried.

FIG. 1B illustrates the operation at the tank 20 during the desiccant regeneration cycle. During regeneration, the microwave generating device 36 at the power head unit 34 is activated and transmits microwave energy through the waveguide for receipt by the antenna 40 having a portion positioned within the waveguide. The microwave energy is carried along the antenna 40 as it extends through the interior 44 of the tank 20 to regenerate saturated desiccant 21 contained therein. In drying the saturated desiccant during the regeneration cycle, a purge gas 46 may selectively be inputted through port 32, passed through the tank 20 containing saturated desiccant 21, and outputted from the tank through port 26. For further details on the drying of wet gas and the regeneration of saturated desiccant in a tank through the use of microwave energy, reference can be made to U.S. Pat. No. 5,429,665 of Botich issued Jul. 4, 1995 and U.S. Pat. No. 5,581,903 of Botich issued Dec. 10, 1996. Unlike the gas drying cycle, FIG. 1A, which is performed with the tank under pressure (such as 100–200 pounds per square inch), during the regeneration cycle, FIG. 1B, the tank preferably operates at approximately atmospheric pressure. Thus, an inventive seal to hold the antenna extending through the opening 42 of the tank 20 have been developed to reduce movement of the antenna during operation and changeover of the gas drying and desiccant regeneration cycles.

Figure 2:
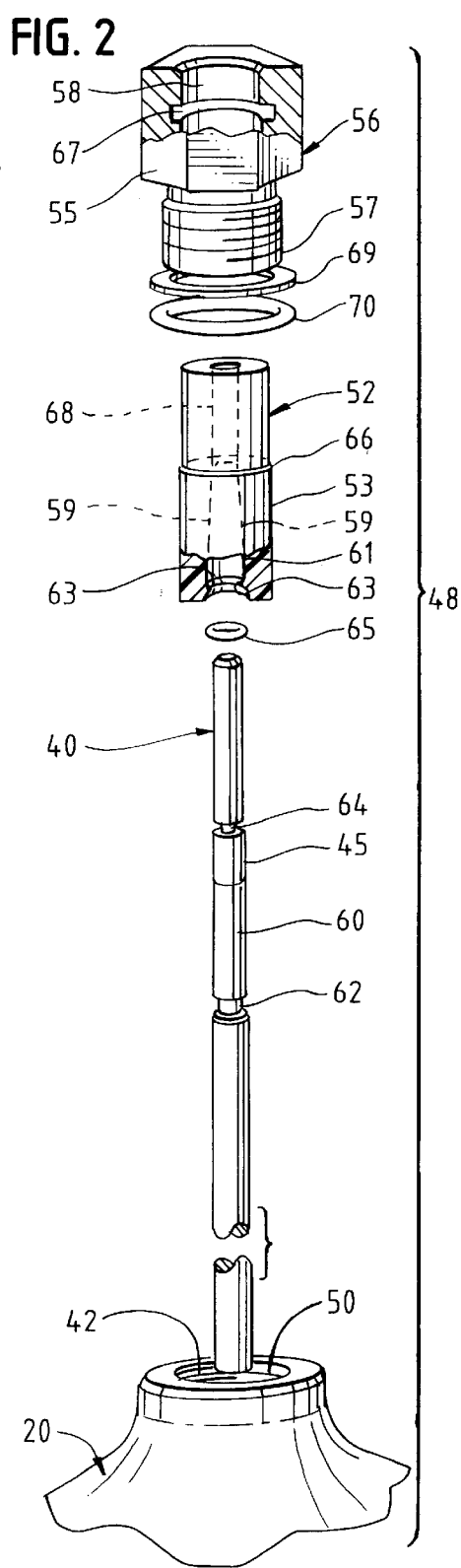
FIG. 2 is an exploded, perspective and partially broken away view of one embodiment of the seal arrangement of the invention.

Referring now to FIG. 2, an exploded view of one embodiment of seal 48 for the opening 42 defined by an interior wall portion 50 proximate the top region 28 of the pressurizable tank 20 is shown. The seal 48 has an insulator 52 having an interior surface 54 for receiving engagement with the antenna 40 proximate the opening 42 of the tank 20. A fitting member 56 has an internal surface 58 for receipt and engagement with an external surface 53 of the insulator 52. The external surface 55 of the fitting member 56 has threaded section 57 for engagement with a compatible threaded section of the wall portions of the tank 20 for securement to the tank. The fitting member is preferably formed of a metallic material such as brass.

As seen in FIG. 2, a portion of the interior surface 54 of the insulator 52 defines a tapered shape in which a distance between opposing portions 59 of the interior surface of the insulator reduces along the length of the insulator. A tapered portion 60 of the antenna 40 which engages the tapered portion 61 of the insulator 52 has a cross section dimension which reduces in size as the antenna extends toward the exterior of the tank. The interior surface 54 of the insulator is positioned about the antenna 40. To provide a tight fit, the tapered portion 61 of the insulator 52 forms a truncated cone and the tapered portion 60 of the antenna which engages the tapered portion of the insulator has a mating truncated cone shape. The insulator may selectively be constructed of polytetrafluoroethylene (commonly known as Teflon™) or alternatively constructed of ceramic material or other suitable materials.

Figure 3A:
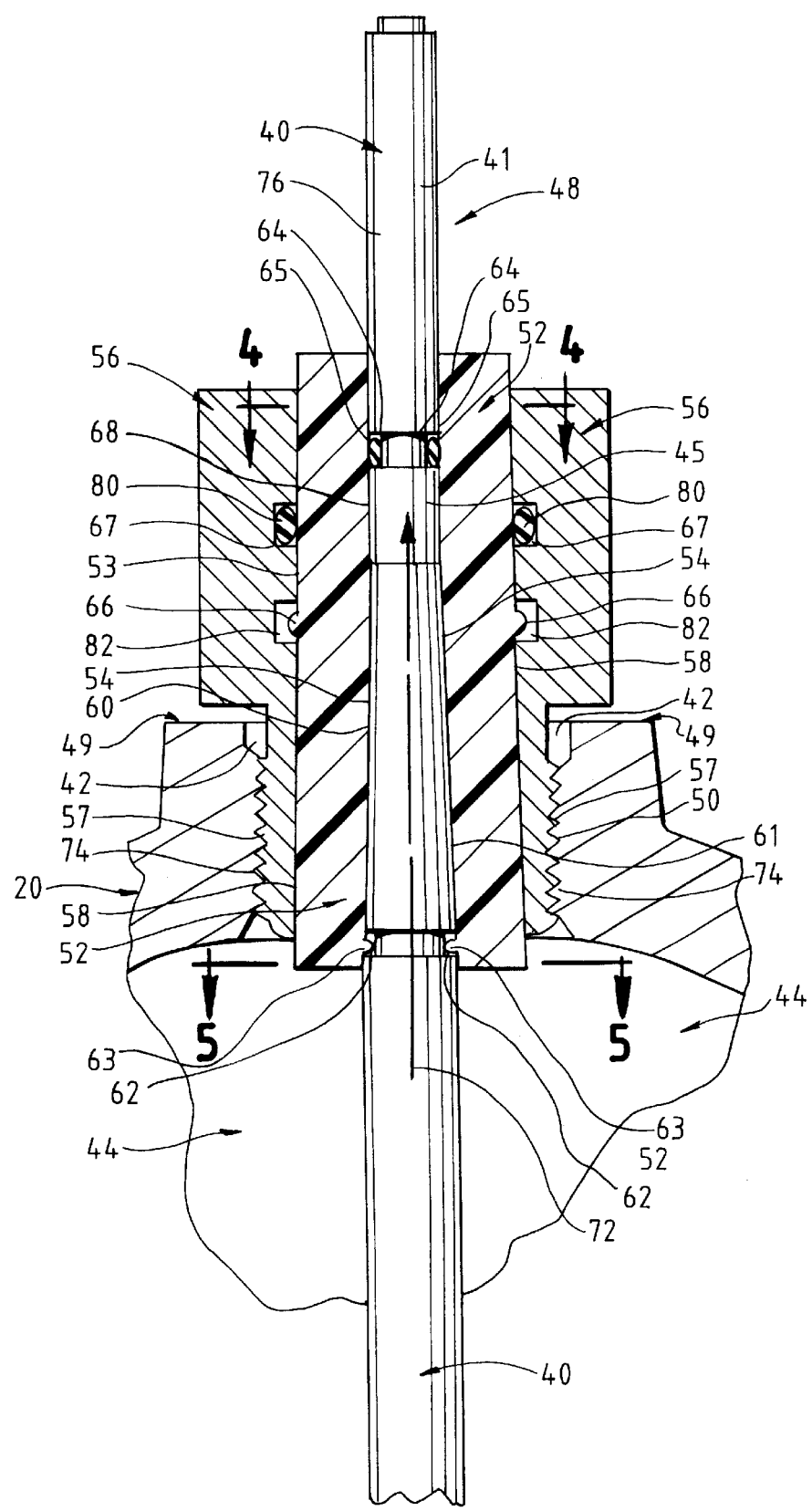
FIG. 3A is a cross sectional view of the seal arrangement of FIG. 2 as assembled and positioned within the opening of the tank.

In the embodiment seen in FIG. 2, antenna 60 has a recess 62 for interlocking relation with tab 63 extending from the interior surface of the insulator 52. A channel 64 formed within the body of the antenna 40 receives a gasket 65 to provide a tight pressure seal between the antenna 40 and the interior surface 54 of the insulator 52. A tab 66 is formed about the external surface 53 of the insulator for receipt and snap fit engagement with a corresponding recess (as seen in FIG. 3A) at the internal surface 58 of the fitting member 56. A channel 67 formed within the body of the fitting member 56 which is in communication with the internal surface 58 of the fitting member 56 and the external surface 53 of the insulator holds an o-ring gasket (as seen in FIG. 3A) to establish a pressure seal between the insulator and the fitting member. As seen in FIG. 2, channel 64 is formed within the body of the antenna 40 and extends along the outer surface 43 of the antenna. The channel 64 surrounds the antenna 40 and the gasket 65 surrounds the antenna when positioned at the channel. The gasket 65 engages a generally non-tapered portion 45 of the antenna 40 at the channel 64 which is spaced apart from the tapered portion 60 of the antenna where the cross section dimension reduces in size. The gasket 65 also engages a generally non-tapered portion 68 of the interior surface 54 of the insulator 52 which is spaced apart from the tapered portion 61 of the insulator interior. The generally non-tapered portion 68 of the interior surface of the insulator is generally parallel to the longitudinal axis of the insulator. As seen in FIG. 2, a flange 69 and an o-ring gasket 70 positioned above the threaded portion 57 of the fitting member 56 may selectively be employed to provide a pressure seal between the top of the tank 20 proximate the opening 42 and the fitting member 56.

Referring now to FIG. 3A, one embodiment of the seal 48 as assembled and positioned within the opening 42 of the tank 20 is shown. The opening 42 is defined by wall portion 50 of the pressurizable tank 20 with the elongate antenna 40 for carrying microwave energy to regenerate desiccant within the tank 20 extending from an interior portion 44 of the tank, through the opening 42 to the exterior portion 49 of the tank. The insulator 52 has interior surface 54 for receiving engagement with the antenna 40 proximate the opening 42 of the tank 20. In the embodiment of FIG. 3A, the interior surface 54 of the insulator 52 defines a shape which is tapered such that the distance between opposing portions 59 of the interior surface reduces as the insulator extends in a direction (illustrated by arrow 72) through the opening 42 toward the exterior 49 of the tank 20. The antenna 40 which engages the interior surface 54 of the insulator 52 has a cross sectional dimension which reduces in size as the antenna extends in the direction 72 through the opening 42 toward the exterior 49 of the tank. The tapered portion 61 of the internal surface 54 of the insulator 52 forms a truncated cone and surrounds the tapered portion 60 of the antenna 40. In the assembled position, the external surface 53 of the insulator 52 is positioned between interior surface 54 of the insulator and the wall portion 50 of the tank 20 which defines the tank opening 42.

As seen in the embodiment of FIG. 3A, the external surface 53 of the insulator 52 is tapered such that a distance between opposing sections of the external surface 53 reduces as the insulator extends through the opening 42 toward the exterior 49 of the tank 20. The fitting member 56 of seal 48 has an internal surface 58 for receipt and engagement with the external surface 53 of the insulator 52. The external surface 53 of the insulator has a truncated cone shape as seen in FIG. 3A. To provide a contoured fit, the internal surface 58 of the fitting member 56 surrounds the external surface 53 of the insulator 52 and is partly tapered such that the distance across opposing positions of the internal surface 58 reduces as the fitting member 56 extends in the direction 72 through the opening 42 toward the exterior 49 of the tank 20.

Figure 4:
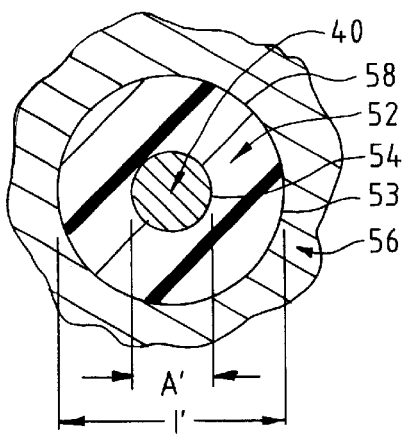
FIG. 4 is a cross sectional view of the seal along line 4—4 of FIG. 3A.
Figure 5:
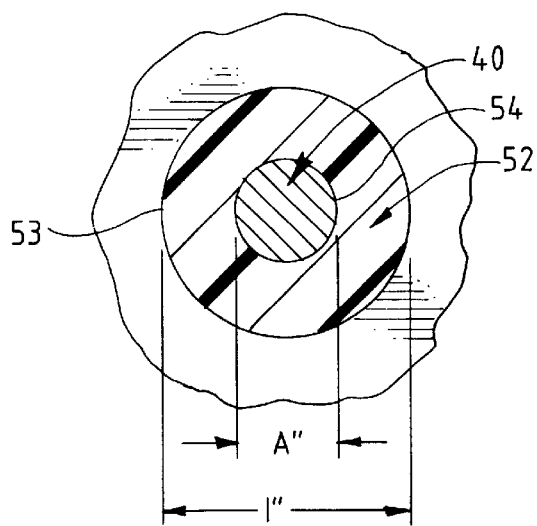
FIG. 5 is a cross sectional view of the seal along line 5—5 of FIG. 3A.

Referring now to FIGS. 4 and 5, cross sectional views of the antenna 40, insulator 52 and fitting member 56 taken along lines 4—4 and 5—5 respectively of FIG. 3A are shown. As seen in FIGS. 4 and 5, the cross section of the antenna 40 is generally circular in shape. The external surface 53 of a cross section of the insulator 52 is also generally circular as illustrated by I' and I" of FIGS. 4, 5. To provide a contoured fit with the external surface 53 of the insulator 52, the internal surface 58 of a cross section of the fitting member 56 is generally circular. The cross section dimension A', FIG. 4, of antenna 40 positioned toward the exterior 49 of the tank 20 is smaller than the cross section dimension A", FIG. 5, positioned toward the interior 44 of the tank. Similarly, the cross section dimension I', FIG. 4, of the external surface 53 of insulator 52, positioned toward the exterior 49 of the tank 20, is smaller than the cross sectional dimension I", FIG. 5, of the external surface of the insulator positioned toward the interior 44 of the tank 20.

Referring again to FIG. 3A, the fitting member 56 is attached to and integral with the wall portion 50 of the pressurizable tank 20 defining the opening of the tank 20. The external surface 55 of the fitting member 56 engages with the wall portion 50 of the tank 20. As seen in FIG. 3A, the external surface 55 of the fitting member 56 has a threaded section 57 and the wall portion 50 of the pressurizable tank 20 has another threaded section 74 compatible with section 57 for threading engagement between the external surface of the fitting member 56 and the wall portion 50 of the tank 20. Alternatively, the external surface 55 of the fitting member 56 is directly welded to the wall portion 50 of the tank 20.

As seen in FIG. 3A, channel 64 is in communication with the antenna 40 and the interior surface 54 of the insulator 52.

Gasket 65 is positioned within the channel 64 such that the gasket 65 engages the antenna 40 and the interior surface 54 of the insulator 52 with the antenna engaged with the interior surface of the insulator. The gasket 65 is preferably constructed of a resilient material such as an elastomeric. Alternatively, the gasket 65 may selectively be constructed of a ceramic material. To provide a pressure seal, between the antenna and insulator, the thickness of the gasket 65 exceeds the depth of the channel 64. As seen in FIG. 3A, the channel 64 is formed within the body 76 of the antenna 40 and extends along the outer surface 41 of the antenna. The channel 64 surrounds the antenna 40 and the gasket surrounds the antenna. The gasket 65 engages the generally non-tapered portion 68 of the interior surface 54 of the insulator 52 which is spaced apart from the tapered portion 61 of the interior surface 54 which defines the tapered cone shape which receives the antenna. As seen in FIG. 3A, the non-tapered portion 68 of the interior surface 54 of the insulator is generally parallel to the longitudinal axis of the insulator 52.

Still referring to FIG. 3A, internal surface 58 of the fitting member 56 engages about the external surface 53 of the insulator 52 and the external surface 55 of the fitting member provides for secured engagement with the wall portion 50 of the tank 20. Channel 67 is in communication with the internal surface 58 of the fitting member 56 and the external surface 53 of the insulator 52. Gasket 80 is positioned within channel 67 such that the gasket 80 engages the external surface 53 of the insulator 52 and the internal surface 58 of the fitting member 56. Gasket 80 may be constructed of a resilient material such as an elastomeric, or alternatively constructed of a ceramic material. The thickness of gasket 80 preferably exceeds the depth of channel 67. As seen in FIG. 3A, channel 67 is formed within the body of fitting member 52 and extends along the internal surface 58 of the fitting member 52. The channel 67 surrounds the external surface 53 of the insulator 52 and the gasket 80 (preferably an o-ring) surrounds the external surface of the insulator 52 with the internal surface 58 of the fitting member 56 in engagement with the external surface of the insulator. The gasket 80 preferably engages a non-tapered portion 78 of the external surface 53 of the insulator which is generally parallel to the longitudinal axis of the insulator.

As further seen in FIG. 3A, a recess 62 is formed within and defined by the outer surface 41 of the antenna 40. A tab 63 extends from the interior surface 54 of the insulator 52 and is positioned within the recess 62 to secure the insulator 52 to the antenna 40. Another recess 82 defined by the internal surface 58 of the fitting member 56 is shown with another tab 66 extending from the external surface 53 of the insulator 52 positioned within the other recess to tightly secure and interlock the insulator 52 to the fitting member 56 by a snap-fit approach.

Figure 3B:
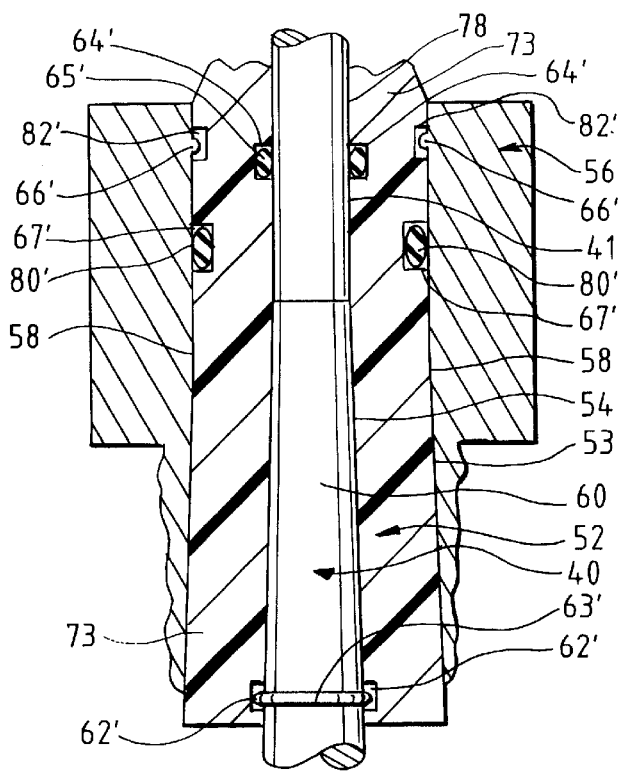
FIG. 3B is another embodiment of a seal arrangement of the present invention.

Referring now to FIG. 3B, an alternative embodiment of the seal arrangement for the tank opening 42 is shown. In the embodiment seen in FIG. 3B, interior surface 54 of insulator 52 defines channel 64'. Channel 64' is formed within body 73 of the insulator 52 and extends along the interior surface 54 of the insulator. Gasket 65' engages the antenna 40 and is positioned within channel 64' for engagement with the interior surface 54 of the insulator 52. As seen in FIG. 3B, the gasket 65' and the channel 64' surround the antenna 40. Gasket 65' engages a generally non-tapered portion 45 of the antenna 40 which is spaced apart from the tapered portion 60 of the antenna 40 which has its cross sectional dimension reducing in size as the antenna extends in a direction from the interior 44, FIG. 3A, of the tank through the opening 42 to the tank exterior 49.

Still referring to FIG. 3B, channel 67' communicates with the internal surface 58 of fitting member 56 and external surface 53 of the insulator 52. Gasket 80' is positioned within channel 67' and engages external surface 53 of insulator 52 and internal surface 58 of fitting member 56. As seen in the embodiment of FIG. 3B, channel 67' is formed within the insulator body 73 and extends along the external surface 53 of the insulator 52. Channel 67' and gasket 80' surround the insulator 52. Gasket 80 preferably engages the non-tapered portion 78 of the internal surface 58 fitting member 56 in which the non-tapered portion 78 is generally parallel to the longitudinal axis of the fitting member 56.

As seen in FIG. 3B, recess 62' is shown formed within the body 73 of insulator 52 and defined by the interior surface 54 of the antenna. Tab 63' extending from the outer surface 41 of the antenna 40 is positioned within the recess 62' to secure the insulator 52 to the antenna 40 in a snap fit relation. As further seen in the embodiment of FIG. 3B, another recess 82' defined by the external surface 53 of the insulator 52 is established. Tab 66' extending from the internal surface 58 of the fitting member 56 is positioned within the other recess 82' to tightly secure the insulator 52 to the fitting member 54.

Figure 6:
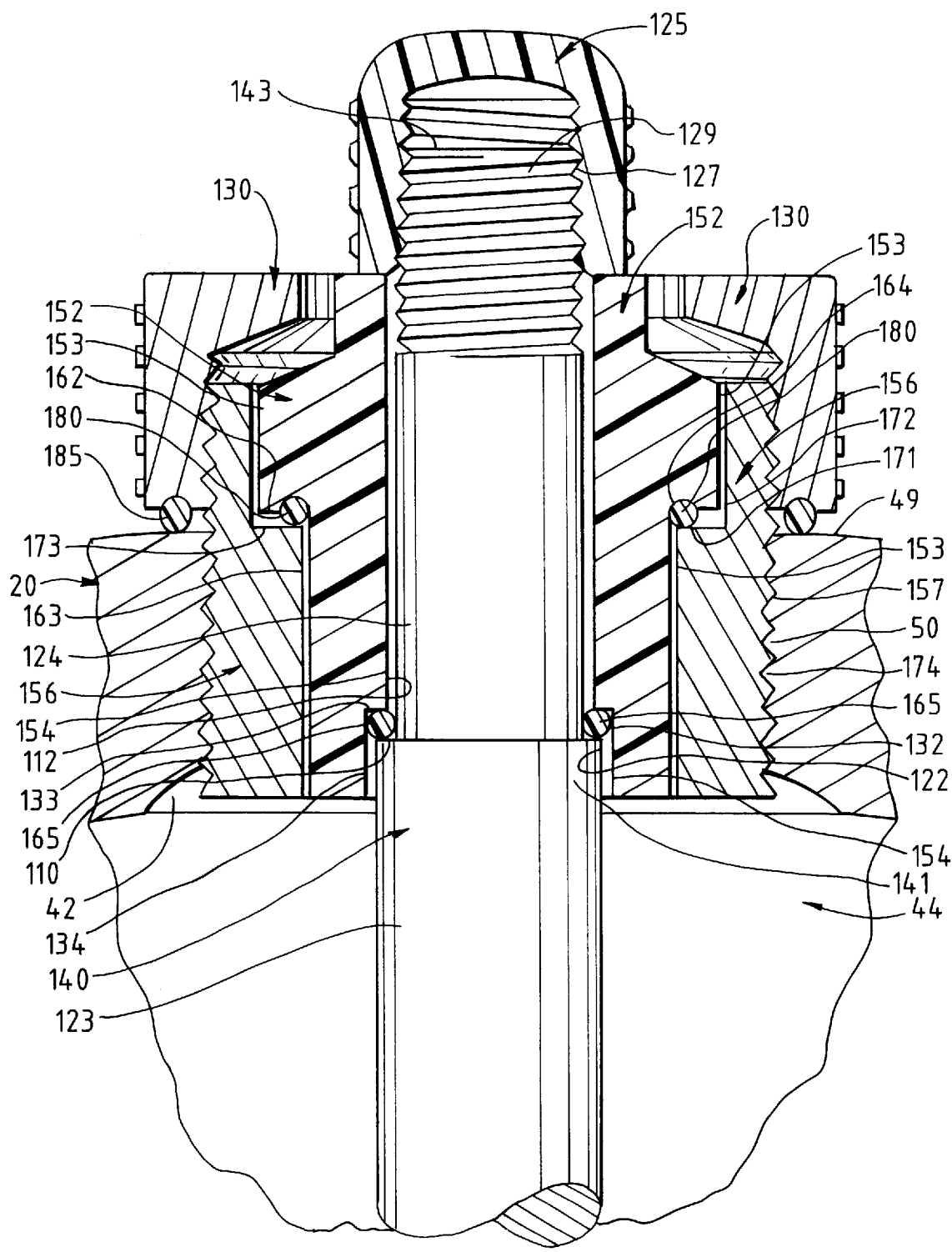
FIG. 6 is a cross sectional view of another embodiment of a seal arrangement of the present invention.

Referring now to FIG. 6, an alternative embodiment of a seal arrangement is shown having various steps at the antenna, insulator and fitting member. As seen in FIG. 6, fitting member 156 is screwed into position for tight securement with the wall 50 of the tank 20 via mating threaded sections 157, 174 of the fitting member 156 and tank wall 50 respectively. A bracket 125 having threaded portion 127 is secured to mating threaded portion 129 proximate the top area 143 of antenna 140 to hold the antenna in position. The bracket 125 prevents the antenna 140 from moving in a direction toward the interior 44 of the tank 20. Insulator 152 is interposed between antenna 140 and fitting member 156 to further hold the antenna 140 in position within the opening 42 of the tank 20. To establish tight pressure seals about the tank opening 42, various annular o-ring gaskets 165, 150, 185 are employed. The fitting member 156 is interposed between the insulator 152 and the tank 20 and bushing member 130 is secured to the fitting member 156 and is positioned to overlie a portion of the insulator 152 and the fitting member 156.

As seen in FIG. 6, the interior surface 154 of the insulator 152 has a step 132 which has a horizontal portion 133 which extends transverse to another adjacent generally vertical portion 134 of the insulator interior surface 154. Due to the step 132 the distance across opposing ends of the interior surface 154 of the insulator 152 is reduced as the insulator extends in the opening 42 from the interior 44 of the tank 20 to the exterior 49 of the tank. The horizontal portion 133 of the step 132 of the insulator 152 forms an annular ring surface about the outer surface 141 of the antenna 140. As seen in FIG. 6, the annular ring surface of the insulator 152 lies in a plane substantially perpendicular to the vertical direction in which the antenna extends. Antenna 140 also has a step 122 with the antenna having a wide portion 123 and a relatively narrower portion 124. A portion 110 of the exterior surface 141 of the antenna 140 extends transverse to another adjacent portion 112 of the antenna. The one generally horizontal portion 110 of the exterior surface 141 of the antenna 140 preferably forms the annular ring about the antenna and is substantially parallel to the annular ring surface of the insulator 152. Annular o-ring gasket 165 is interposed between the annular ring surface of the antenna 140 and the annular ring surface of the interior surface of the insulator 152. The annular ring surface of the antenna 140 formed by step 122 lies in a plane which is substantially perpendicular to. the direction in which the antenna extends. As seen in FIG. 6, the annular ring surface of the insulator 152 formed by step 132 is positioned to overlie the annular ring surface, formed by step 122 of the antenna 140. The annular ring surface of the insulator 152 at the opening 42 of the tank 20 is positioned above and toward the exterior 49 of the tank 20 relative to the annular ring surface of the antenna 140.

Still referring to FIG. 6, a horizontal portion 162 of the external surface 153 of the insulator 152 extends transverse to another (vertical) portion 163, which is adjacent to the one portion 162 of the external surface of the insulator 152. The step 164 at the external surface 153 of the insulator 152 forms an annular ring surface about the insulator. As seen in FIG. 6, the annular ring surface of the insulator 152 lies in a plane which is substantially perpendicular to the direction of the antenna 140.

The internal surface 158 of the fitting member 156 has a generally horizontal portion 171 which extends transverse to an adjacent and generally vertical portion 172 of the internal surface of the fitting member. The step 173 at the internal surface 158 of the fitting member 156 forms an annular ring surface about the external surface 153 of the insulator 152 and engages the annular ring surface formed by the external surface 153 of the insulator. As seen in FIG. 6, o-ring gasket 180 is interposed between the annular ring surface of the internal surface 158 of the fitting member 156 and the annular ring surface of the external surface 153 of the insulator 152. The annular ring surface of the internal surface 158 of the fitting member 156 overlies the annular ring surface of the insulator 152. The annular ring surface of the internal surface 152 of the fitting member 156 is positioned at the opening of the tank 20, above and away, toward the exterior 49 of the tank relative to the annular ring surface of the external surface 153 of the insulator 152. As seen in FIG. 6, the annular ring surface of the internal surface 158 of the fitting member 156 lies in a plane which is substantially perpendicular to the vertical direction in which the antenna 140 extends.

Referring now to FIG. 7, another embodiment of the invention is shown with fitting member 56 having internal surface 58 engaging about the external surface 53 of the insulator 52. The external surface 55 of the fitting member 56 is secured into fixed engagement with the wall portion 50 defining the opening 42 of the tank 40. O-ring gasket 65 is positioned within channel 64 and about antenna 40 to provide a pressure seal between the antenna and the insulator 52. O-ring gasket 80 is positioned within channel 67 and about the external surface 53 of the insulator 52 to provide a pressure seal between the insulator and the fitting member 56. As seen in the embodiment of FIG. 7, a pin 84 acting as a securement member engages the fitting member 56, the insulator 52 and the antenna 40 to maintain the insulator and antenna in position and prevent the antenna and insulator from moving in a direction through the opening 42 toward the interior 44 of the tank 20. In the embodiment of FIG. 7, the pin 84 preferably prevents the antenna and insulator from moving in the downward direction into the tank 20 during changeover from a gas drying cycle to a desiccant regenerating cycle.

As seen in FIG. 7, the pin 84 laterally and substantially perpendicularly extends into the fitting member 56, insulator 52 and the antenna 40. The pin 84 preferably laterally extends substantially through the fitting member 56, insulator 52 and antenna 40. The pin securement member 84 is spaced apart from o-ring gasket 80 (between fitting member and insulator) and is positioned above and away from the tank opening and tank interior 44 relative to the gasket 80. As seen in FIG. 7, the pin 84 is also spaced apart from o-ring gasket 65 (between the antenna and insulator) and is positioned above and in a direction away from the tank opening 42 and interior 44 relative to gasket 65.

Referring now to FIG. 8, the seal arrangement is shown having internal surface 58 of fitting member 56 engaged about the external surface 53 of the insulator 52. The external surface 55 of the fitting member 56 is securably engaged with the wall portion 50 forming the opening 42 of the tank. Gasket 65, preferably in the shape of an o-ring, is maintained within channel 64 and about antenna 40 to establish a pressure seal between the insulator 52 and the antenna. Gasket 80 is placed within channel 67 and surrounds the external surface 53 of the insulator 52 to create a pressure seal between the insulator and the fitting member 56. As seen in FIG. 8, a set screw 86 acting as a securement member engages the fitting member 56 and the insulator 52 to maintain the insulator in position and prevent it from moving in the downward direction through the opening 42 toward the interior 44 of the tank 20.

As seen in FIG. 8, set screw securement member 86 substantially perpendicularly extends into the fitting member 56 and engages through a portion of the body 73 of the insulator 52. The set screw 86 laterally engages the insulator 52 and is positioned into abutment with the antenna 40. The set screw 86 prevents the insulator 52 and antenna 40 from moving out of position during the desiccant regeneration and gas drying cycles or between changeover of the cycles. As seen in FIG. 8, the set screw 86 is spaced apart from gasket 80 with the set screw positioned in a direction away from the tank interior 44 relative to the gasket. The set screw 86 is also spaced apart from gasket 65 in which the set screw is positioned above and away from the tank interior 44 relative to the position of the gasket 65.

Referring now to FIGS. 9 and 10, alternative embodiments of the seal arrangement for the tank are shown with each having an antenna which is relatively straight without a tapered portion. An antenna and insulator having making tapered portions, such as those seen in FIGS. 2, 3A and 3B may also selectively be employed. To limit movement of the insulator 52 surrounding antenna 40, tab 66 extending from the external surface 53 of the insulator 52, is locked into position within recess 82, in the embodiment of FIG. 9, at the internal surface 58 of the fitting member 56. As seen in FIG. 9, pin 84 laterally extends into and through the fitting member 56, insulator 52 and antenna 40 to hold the antenna and insulator in place. In the embodiment of FIG. 10, set screw 86 is laterally inserted through a side of fitting member 56 and insulator 52. The set screw 86, FIG. 10, abuts with the non-tapered antenna 40 to reduce vertical movement of the insulator 52 and/or antenna during desiccant regeneration and gas drying cycles.

As seen in both FIGS. 9 and 10, gasket 65 is positioned within channel 64 and surrounds antenna 40 to establish a pressure seal between the insulator 52 and the antenna 40. Gasket 80 is placed in channel 67 formed in fitting member 56 and surrounds insulator 52 to establish the pressure seal between the fitting member and the insulator. The insulator 52 is engaged about the antenna 40 at the opening 42 of the tank 20 with the external surface 53 of the insulator 52 engaging the fitting member 56. The external surface 55 of the fitting member 56 securably engages with the wall 50 defining the opening of the tank 20.

In the embodiments of FIGS. 9 and 10, a bracket 88 secured to the antenna 40 is provided to prevent movement of the antenna in the direction 90 toward the interior 44 of the tank 20. In these embodiments, the bracket 88 is secured to the antenna 40 with an attachment member such as screw 92 positioned through bracket to prevent the antenna 40 from moving downward toward the tank interior 44. As seen in FIGS. 9 and 10, the antenna 40 may selectively be spaced apart from the bracket 88 with attachment member 92 interposed between the antenna and bracket and secured to both the antenna and bracket. The bracket 88 has a channel 89 which encloses the antenna 40. The bracket 88 has a pair of vertical sidewalls 87 which are secured (at a lower portion of the sidewalls) to the fitting member 56 that is engaged about insulator 52 and is also secured to the tank 20. The vertical sidewalls 87 of the bracket 88 are spaced apart from the antenna 40 and are positioned in a direction which is generally parallel to the antenna. A transverse sidewall 85 of the bracket 88, which is generally transverse to sidewalls 87, is secured by screw 92 to the antenna 40. Alternatively, the bracket 88 may selectively be secured directly to the exterior of the tank 20. In certain gas drying applications, the waveguide 38, FIGS. 1A and 1B, may selectively be employed as the bracket having the channel with a screw positioned through the housing of the waveguide and drilled into engagement with the antenna. A clip may selectively be employed (in place of a screw) to secure the antenna 40 to the bracket 88.

Figure 11:
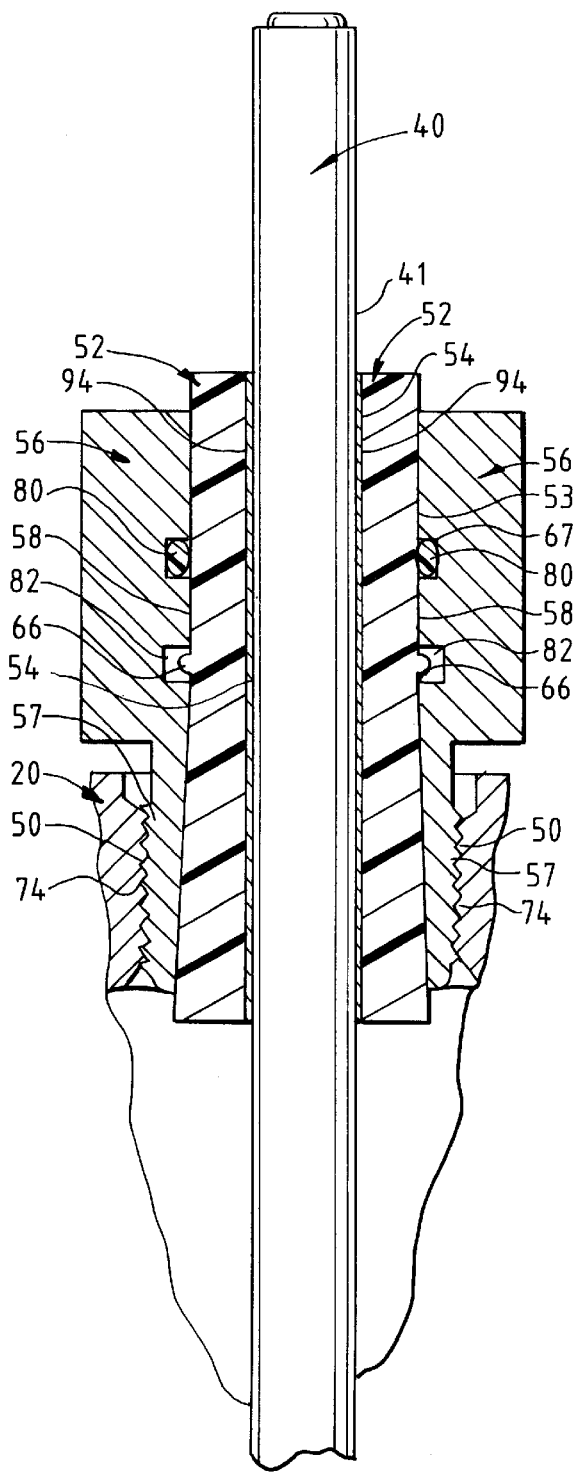
FIG. 11 is a cross sectional view illustrating another embodiment of a seal arrangement of the present invention.

Referring now to FIG. 11, one embodiment of the invention is shown with the interior surface 54 of the insulator 52 adhered to the outer surface 41 of the antenna 40 by an adhesive compound 94. The adhesive compound 94 is positioned between and contacts with the interior surface 54 of the insulator 52 and the antenna 40 for securing the insulator to the antenna. As seen in FIG. 11, the elongate antenna 40 is relatively straight and uniform throughout its length, however, an antenna having both tapered and non-tapered portions such as seen in FIGS. 2, 3A and 3B may selectively be employed. The adhesive compound 94 secures the insulator 52 to the antenna 40. The insulator 52 is locked into place and secured to the fitting member 56 by tab 66 at the external surface 53 of insulator 52 positioned within recess 82 at the internal surface 58 of the fitting member 56. A pressure seal is formed between the fitting member 56 and insulator 52 by means of o-ring gasket 80 positioned within channel 67. As seen in FIG. 11, the external surface 53 of the insulator 52 is positioned between the interior surface 54 of the insulator and the wall 50 defining the opening of the tank 20. The external surface 53 of the insulator 52 is locked into securement with the internal surface 58 of the fitting member 56. The threaded section 57 of fitting member 56 is screwed into fixed position with the complimentary threaded section 74 of the tank wall 50 enabling tight securement of the fitting member, insulator and antenna at the opening of the tank.

Figure 12:
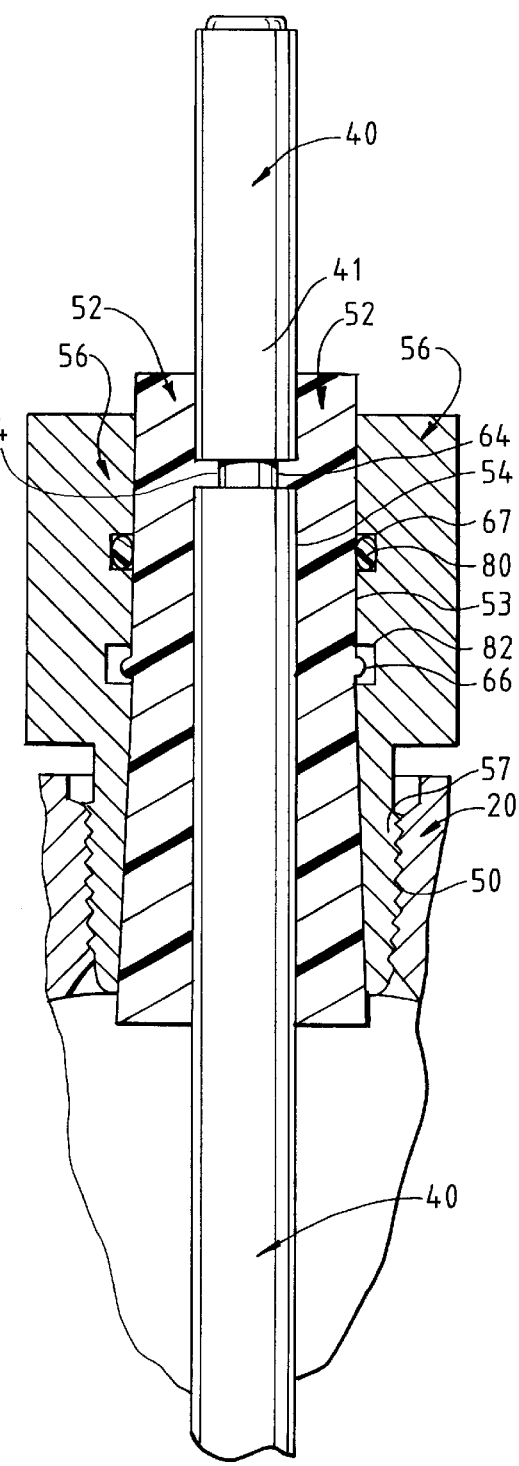
FIG. 12 is a cross sectional view illustrating another embodiment of a seal arrangement of the present invention.

Referring now to FIG. 12, another alternative embodiment of the invention is shown having the interior surface 54 of the insulator 52 directly molded to and about the outer surface 41 of the antenna 40. The insulator 52 is at least partly constructed of a moldable material which adheres to the antenna. The moldable material may selectively include moldable plastic material, castable materials and the like which are suitable for accomplishing the requirements set forth herein as will be understood by those skilled in the art. As seen in FIG. 12, the interior surface 54 of the insulator 52 is molded in channel 64 and along the rest of outer surface 41 of the antenna 40. The interior surface 54 of the insulator 52 which receivably engages the antenna 40 may selectively be formed of the moldable material which is heated and cured about the antenna. The antenna having the adhered insulator about its surface is locked into engagement with the fitting member 56 by tab 66 (at the external surface of the insulator) snapped into position in recess 82 of the fitting member. O-ring gasket 80 is placed within channel 67 and is positioned about the external surface 53 of the insulator 52 to provide a pressure seal. The threaded portion 57 of the fitting member 56 is screwed into position and engages the tank wall 50 to enable the fitting member, insulator and antenna to be held in position at the opening of the tank.

The present invention provides a method for holding an elongate antenna in position during pressurization of a pressurizable tank, in which the tank contains desiccant for drying a gas passed through the desiccant. The antenna extends through the opening defined by the wall portion of the tank from an exterior portion to an interior portion of the tank and the antenna is used for receiving microwave energy, to regenerate the desiccant in the tank. The inventive method includes the steps of (1) engaging a tapered portion of the antenna with a corresponding tapered portion of an interior surface of an insulator, and (2) positioning an external surface of the insulator between the interior surface of the insulator and the wall portion of the pressurizable tank which defines the opening of the tank.

The method of holding the antenna in position includes the step of positioning the tapered portion of the interior surface of the insulator within the opening of the tank such that a distance between opposing portions of the interior surface reduces as the insulator extends in a direction through the opening toward an exterior of the tank. The tapered portion of the interior surface of the insulator preferably forms a truncated cone. The step of positioning the tapered portion of the antenna within the opening of the tank such that the tapered portion has a cross section which reduces in size as the antenna extends in the direction through the opening toward the exterior of the tank is performed. A fitting member is engaged with the external surface of the insulator. The method includes engaging the exterior surface of the fitting member with the wall portion of the pressurizable tank defining the opening of the tank.

The external surface of the insulator is positioned within the opening of the tank such that a distance between opposing portions of the external surface reduces as the insulator extends in the direction through the opening toward the exterior of the tank. The step of surrounding the external surface of the insulator with a portion of the internal surface of the fitting member which forms a truncated cone is performed.

The method further selectively includes the steps of placing a channel in communication with the antenna and the interior surface of the insulator, and positioning a gasket within the channel such that the gasket engages the antenna and the interior surface of the insulator. The steps of forming the channel within a body of the insulator, extending the channel along the interior surface of the insulator, and positioning the gasket to surround the antenna are also selectively performed. Alternatively, the steps of forming the channel within a body of the antenna extending the channel along the surface of the antenna, and positioning the gasket to surround the antenna may be accomplished.

To provide a pressure seal between the fitting member and the insulator, the steps of placing a channel in communication with the internal surface of the fitting member and the external surface of the insulator, and positioning a gasket within the channel such that the gasket engages the external surface of the insulator and the internal surface of the fitting member are performed. The channel is selectively formed within the body of the insulator, with the channel extending along the external surface of the insulator, and the step of positioning the gasket to surround the insulator is performed. Alternatively, the steps of forming the channel within the body of the fitting member, extending the channel along the internal surface of the fitting member, and positioning the gasket to surround the external surface of the insulator are selectively performed.

A method for holding an elongate antenna in position during depressurization of the pressurizable tank containing desiccant for drying a gas passed through the desiccant is also performed. The method comprises the steps of (1) positioning the antenna in a direction through the opening of the tank, (2) engaging the antenna with an interior surface of an insulator at a position proximate the opening of the tank, and (3) holding the antenna by securement which is generally transverse to the direction of the elongate antenna to prevent movement of the antenna in a direction toward an interior of the tank.

Holding the antenna preferably includes the step of securing a bracket to the antenna to prevent movement of the antenna in the direction through the opening toward the interior of the tank. The step of positioning a sidewall of the bracket, which is spaced apart from the antenna, in a direction generally parallel to the direction of the antenna is selectively performed. A transverse sidewall of the bracket, which is generally transverse to the sidewall of the bracket, is preferably secured to the antenna. The lower portion of the sidewall is mounted to the tank to limit movement of the bracket.

The method includes the steps of engaging an internal surface of a fitting member about an external surface of the insulator, engaging the fitting member with the wall portion of the tank which defines the opening of the tank, and engaging a securement member with the fitting member and at least one of (a) the insulator, and (b) the insulator and the antenna for maintaining at least one of (a) and (b) from moving in the direction through the opening toward the interior of the tank. Securement is selectively performed by laterally extending a pin into engagement with the fitting member, the insulator and the antenna. Alternatively, a set screw may be extended into engagement with the fitting member, the insulator and the antenna.

The fitting member is preferably engaged about the external surface of the insulator, and the fitting member is engaged with the wall portion of the tank defining the opening. A recess is established in one of (a) the antenna, and (b) the interior surface of the insulator, and a tab, extending from the other of (a) and (b), is positioned within the recess to secure the insulator to the antenna. The method further includes the steps of establishing another recess defined by one of (c) an external surface of the insulator, and (d) an internal surface of the fitting member, and positioning another tab, extending from the other of (c) and (d), within the other recess to secure the insulator to the fitting member.

An alternative method for holding the elongate antenna in position during pressurization and depressurization of the pressurizable tank may also be performed. The method comprises the steps of (1) adhering the insulator to the antenna, (2) positioning the antenna through the opening in the tank and positioning the insulator proximate to the opening, and (3) securing the insulator to the tank. Adhering the insulator to the antenna may selectively include positioning an adhering compound between an interior surface of the insulator and the antenna. Alternatively, adhering may be performed by utilizing a moldable material for constructing the insulator and molding the moldable material of the insulator to the antenna.

While a detailed description of the preferred embodiments of the invention have been given, it should be appreciated that many variations can be made thereto without departing from the scope of the invention set forth in the appended claims.

What is claimed is:

1. A seal for an opening defined by a wall portion of a pressurizable tank, said tank contains desiccant for drying a gas passed through the desiccant in which an elongate antenna for carrying microwave energy to the desiccant for regeneration of the desiccant extends from an interior portion of the tank through the opening to an exterior portion of the tank, comprising:

an insulator having an interior surface for receiving engagement with the antenna proximate the opening of the tank;

said interior surface of the insulator defines a shape such that a distance between opposing portions of the interior surface of the insulator reduces as the insulator extends in a direction through the opening toward the exterior of the tank for receiving engagement with the antenna;

said antenna which engages the interior surface of the insulator has a cross section dimension which reduces in size as the antenna extends in the direction through the opening toward the exterior of the tank; and an external surface of the insulator which opposes the interior surface of the insulator in which the external surface is positioned between the interior surface of the insulator and the wall portion of the pressurizable tank which defines the opening of the tank.

2. The seal of claim 1 in which the insulator is constructed of polytetrafluoroethylene.

3. The seal of claim 1 in which the insulator is constructed of ceramic material.

4. The seal of claim 1 in which the interior surface of the insulator is positioned about the antenna.

5. The seal of claim 1 in which at least a portion of the interior surface of the insulator forms a truncated cone.

6. The seal of claim 5 in which the cross section of the antenna is generally circular.

7. The seal of claim 6 in which a tapered portion of the antenna engaging the insulator has a truncated cone shape.

8. The seal of claim 1 in which the interior surface of the insulator has a portion which extends transverse to another portion of the interior surface of the insulator adjacent to the portion of the interior surface of the insulator.

9. The seal of claim 8 in which the portion of the interior surface of the insulator forms an annular ring surface about the antenna.

10. The seal of claim 9 in which the annular ring surface of the insulator lies in a plane substantially perpendicular to a direction in which the antenna extends.

11. The seal of claim 8 in which the antenna includes an exterior surface in which a portion of the exterior surface extends transverse to another portion of the exterior surface of the antenna adjacent to the portion of the exterior surface of the antenna which forms an annular ring surface about the antenna.

12. The seal of claim 11 in which an annular o-ring is interposed between the annular ring surface of the exterior surface of the antenna and the annular ring surface of the interior surface of the insulator.

13. The seal of claim 11 in which the annular ring surface of the insulator is positioned to overlie the annular ring surface of the antenna in which the annular ring surface of the insulator is positioned in the direction which extends through the opening of the tank toward the exterior of the tank relative to the annular ring surface of the antenna.

14. The seal of claim 11 in which the annular ring surface of the antenna lies in a plane substantially perpendicular to a direction in which the antenna extends.

15. The method of claim 11 including the step of engaging an exterior surface of the fitting member with the wall portion of the tank which defines the opening of the tank.

16. The seal of claim 1 in which the external surface of the insulator is tapered such that a distance between opposing portions of the external surface reduces as the insulator extends in the direction through the opening toward the exterior of the tank.

17. The seal of claim 16 in which the external surface of a cross section of the insulator is generally circular.

18. The seal of claim 17 in which the external surface of the insulator has a truncated cone shape.

19. The seal of claim 1 in which the external surface of the insulator has a portion which extends transverse to another portion of the external surface of the insulator adjacent to the portion of the external surface of the insulator.

20. The seal of claim 19 in which the external surface of the insulator forms an annular ring surface about the insulator.

21. The seal of claim 20 in which the annular ring surface of the insulator lies in a plane substantially perpendicular to the direction of the antenna.

22. The seal of claims 20 in which a fitting member has an internal surface which has a portion which extends transverse to another portion of the internal surface of the fitting member adjacent to the portion of the internal surface of the fitting member which forms an annular ring surface about the external surface of the insulator and engages the annular ring surface formed by the external surface of the insulator.

23. The seal of claim 22 in which another o-ring is interposed between the annular ring surface of the internal surface of the fitting member and the annular ring surface of the exterior surface of the insulator.

24. The seal of claim 22 in which the annular ring surface of the internal surface of the fitting member overlies the annular ring surface of the insulator in which the annular ring surface of the internal surface of the fitting member is positioned in the direction which extends through the opening of the tank toward the exterior of the tank relative to the annular ring surface of the external surface of the insulator.

25. The seal of claim 24 in which the annular ring surface of the internal surface of the fitting member lies in a plane substantially perpendicular to the direction in which the antenna extends.

26. The seal of claim 19 including a fitting member interposed between the insulator and the tank in which the fitting member is secured to the tank and a bushing member secured to the fitting member and positioned to overlie at least a portion of the fitting member and insulator.

27. The seal of claim 1 including a bracket member secured to the antenna and secured to the tank for preventing the antenna from moving in a direction toward the interior of the tank.

28. The seal of claim 16 including a fitting member having an internal surface for receipt and engagement with the external surface of the insulator.

29. The seal of claim 28 in which a distance across opposing portions of the internal surface of the fitting member reduces as the fitting member extends in the direction through the opening toward the exterior of the tank.

30. The seal of claim 29 in which the internal surface of a cross section of the fitting member is generally circular.

31. The seal of claim 30 in which the internal surface of the fitting member forms a truncated cone.

32. The seal of claim 28 in which the fitting member is constructed of a metallic material.

33. The seal of claim 28 in which the internal surface of the fitting member surrounds the external surface of the insulator.

34. The seal of claims 28 in which the fitting member is integral with the wall portion of the pressurizable tank defining the opening of the tank.

35. The seal of claim 28 in which the fitting member has an exterior surface which engages with the wall portion of the pressurizable tank defining the opening of the tank.

36. The seal of claim 35 in which the external surface of the fitting member has a threaded section and the wall portion of the pressurizable tank has another threaded section compatible to the threaded section of the fitting member for threading engagement between the external surface of the fitting member and the wall portion of the pressurizable tank.

37. The seal of claim 35 in which the exterior surface of the fitting member is welded to the wall portion of the pressurizable tank defining the opening of the tank.

38. The seal of claim 1 including
 a channel in communication with the antenna and the interior surface of the insulator, and
 a gasket positioned within the channel such that the gasket engages the antenna and the interior surface of the insulator with the antenna engaged with the interior surface of the insulator.

39. The seal of claim 38 in which the gasket is constructed of a resilient material.

40. The seal of claim 39 in which the resilient material is elastomeric.

41. The seal of claim 38 in which the gasket is constructed of a ceramic material.

42. The seal of claim 38 in which a thickness of the gasket exceeds the depth of the channel.

43. The seal of claim 38 in which the interior surface of the insulator defines the channel with the channel being formed within a body of the insulator and extending along the interior surface of the insulator.

44. The seal of claim 41 in which the channel surrounds the antenna and the gasket surrounds the antenna.

45. The seal of claim 42 in which the gasket engages a generally non-tapered portion of the antenna which is spaced apart from a tapered portion of the antenna where the cross section dimension reduces in size.

46. The seal of claim 38 in which the channel is formed within a body of the antenna and the channel extends along a surface of the antenna.

47. The seal of claim 46 in which the channel surrounds the antenna and the gasket surrounds the antenna.

48. The seal of claim 47 in which the gasket engages a generally non-tapered portion of the interior surface of the insulator which is spaced apart from a tapered portion of the interior surface of the insulator which defines the shape which is tapered, said generally non-tapered portion of the interior surface of the insulator is generally parallel to a longitudinal axis of the insulator.

49. The seal of claim 1 including
 a fitting member having an internal surface for engagement about the external surface of the insulator in which the fitting member provides for secured engagement with the wall portion of the pressurizable tank which defines the opening of the tank, a channel in communication with the internal surface of the fitting member and the external surface of the insulator, and a gasket positioned within the channel such that the gasket engages the external surface of the insulator and the internal surface of the fitting member.

50. The seal of claim 49 in which the gasket is constructed of a resilient material.

51. The seal of claim 50 in which the resilient material is elastomeric.

52. The seal of claim 49 in which the gasket is constructed of a ceramic material.

53. The seal of claim 49 in which a thickness of the gasket exceeds the depth of the channel.

54. The seal of claim 49 in which the channel is formed within a body of the insulator and extends along the external surface of the insulator.

55. The seal of claim 54 in which the channel surrounds the insulator and the gasket surrounds the insulator.

56. The seal of claim 55 in which the gasket engages a portion of the internal surface of the fitting member in which the portion of the internal surface of the fitting member is generally parallel to a longitudinal axis of the fitting member.

57. The seal of claim 49 in which the channel is formed within a body of the fitting member and extends along the internal surface of the fitting member.

58. The seal of claim 57 in which the channel surrounds the external surface of the insulator and the gasket surrounds the external surface of the insulator with the internal surface of the fitting member in engagement with the external surface of the insulator.

59. The seal of claim 58 in which the gasket engages a portion of the external surface of the insulator in which the portion of the external surface of the insulator is generally parallel to a longitudinal axis of the insulator.

60. The seal of claim 49 in which the fitting member is integral with the wall portion of the tank defining the opening of the tank.

61. The seal of claim 49 in which the fitting member includes an external surface which engages with the wall portion of the tank which defines the opening.

62. The seal of claim 1 including a fitting member having an internal surface for engagement about the external surface of the insulator and in which the fitting member provides securing engagement with the wall portion of the pressurizable tank which defines the opening of the tank, a recess defined by one of (a) a surface of the antenna, and (b) the interior surface of the insulator, and a tab extending from the other of (a) the surface of the antenna, and (b) the interior surface of the insulator, said tab positioned within the recess to secure the insulator to the antenna.

63. The seal of claim 62 including another recess defined by one of (c) the external surface of the insulator, and (d) the internal surface of the fitting member.

64. The seal of claim 61 including another tab extending from the other of (c) the external surface of the insulator, and (d) the internal surface of the fitting member, said other tab positioned within the other recess to secure the insulator to the fitting member.

65. The seal of claim 62 in which the fitting member is integral with the wall portion of the tank which defines the opening of the tank.

66. The seal of claim 62 in which the fitting member has an exterior surface which securably engages with the wall portion of the tank which defines the opening of the tank.

67. The seal of claim 1 including a fitting member having an internal surface for engagement about the external surface of the insulator, in which the fitting member provides securing engagement with the wall portion of the pressurizable tank which defines the opening of the tank, and a securement member which engages the fitting member and engages at least one of (a) the insulator, and (b) the insulator and the antenna for maintaining at least one of (a) the insulator, and (b) the insulator and the antenna from moving in a direction through the opening toward the interior of the tank.

68. The seal of claim 67 in which the fitting member is integral with the wall portion of the tank which defines the opening of the tank.

69. The seal of claim 67 in which the fitting member has an exterior surface which is secured to the wall portion of the pressurizable tank which defines the opening of the tank.

70. The seal of claim 67 in which the securement member includes a pin which extends into the fitting member and into the insulator.

71. The seal of claim 70 in which the pin extends into the antenna.

72. The seal of claim 71 in which the pin extends substantially through the fitting member, insulator and the antenna.

73. The seal of claim 67 in which the securement member includes a set screw extending into the fitting member and engaging the insulator.

74. The seal of claim 73 in which the set screw extends into the insulator and engages the antenna.

75. The seal of claim 67 including a gasket positioned between the fitting member and the insulator, said securement member is spaced apart from the gasket and is positioned away from the interior of the tank relative to the gasket.

76. The seal of claim 67 including a gasket positioned between the insulator and the antenna, said securement member which engages the insulator and the antenna is spaced apart from the gasket and is positioned away from the interior of the tank relative to the gasket member.

77. The seal of claim 1 including a bracket secured to the antenna to prevent the movement of the antenna in the direction toward the interior of the tank.

78. The seal of claim 77 in which the bracket includes a channel.

79. The seal of claim 78 in which the channel encloses at least a portion of the antennae.

80. The seal of claim 77 in which the bracket is secured to the antenna with a screw positioned through the bracket.

81. The seal of claim 77 in which the bracket is secured to the antenna with a clip.

82. The seal of claim 77 in which the antenna is spaced apart from the bracket, and an attachment member interposed between the antenna and the bracket is secured to both the antenna and the bracket.

83. The seal of claim 77 in which the bracket is secured to a fitting member which engages about the insulator.

84. The seal of claim 83 in which the fitting member is secured to the tank.

85. A seal for an opening defined by a wall portion of a pressurizable tank, said tank contains desiccant for drying gas which is passed through the desiccant in which an elongate antenna for carrying microwave energy to the desiccant for regeneration of the desiccant projects from an interior of the tank through the opening to an exterior of the tank, comprising:

an insulator having an interior surface for receiving engagement with a portion of the antenna proximate the opening of the tank;

a channel in communication with the antenna and the interior surface of the insulator; and a gasket positioned within the channel such that the gasket engages the antenna and the interior surface of the insulator with the antenna engaged with the interior surface of the insulator.

86. The seal of claim 85 in which the gasket is constructed of a resilient material.

87. The seal of claim 86 in which the resilient material is elastomeric.

88. The seal of claim 89 in which the gasket is constructed of ceramic material.

89. The seal of claim 85 in which a thickness of the gasket exceeds the depth of the channel.

90. The seal of claim 85 in which the interior surface of the insulator defines the channel with the channel being formed within a body of the insulator and extending along the interior surface of the insulator.

91. The seal of claim 90 in which the channel surrounds the antenna and the gasket surrounds the antenna.

92. The seal of claim 91 in which the gasket engages a generally non-tapered portion of the antenna which is spaced apart from a tapered portion of the antenna where the cross section dimension reduces in size.

93. The seal of claim 85 in which the channel is formed within a body of the antenna and the channel extends along a surface of the antenna.

94. The seal of claim 93 in which the channel surrounds the antenna and the gasket surrounds the antenna.

95. The seal of claim 94 in which the gasket engages a generally non-tapered portion of the interior surface of the insulator which is spaced apart from a tapered portion of the interior surface of the insulator, said generally non-tapered portion of the interior surface of the insulator is generally parallel to a longitudinal axis of the insulator.

96. The seal of claim 85 including a portion of the interior surface of the insulator defines a shape which is tapered such that a distance between opposing portions of the interior surface of the insulator reduces as the insulator extends in a direction through the opening toward the exterior of the tank, said antenna engaging the interior surface of the insulator having a cross section dimension which reduces in size as the antenna extends in the direction through the opening toward the exterior of the tank, and an external surface of the insulator positioned between the interior surface of the insulator and the wall portion of the pressurizable tank which defines the opening of the tank.

97. The seal of claim 85 in which the insulator was an external surface opposing the interior surface of the insulator, and a fitting member for engagement about the external surface of the insulator, said fitting member having an internal surface for engaging the external surface of the insulator and said fitting member provides securing engagement of the insulator with the wall portion of the pressurizable tank which defines the opening.

98. The seal of claim 97 in which the fitting member is integral with the wall portion of the tank.

99. The seal of claim 85 in which the insulator has an external surface which engages a fitting member, said fitting member having an internal surface for engagement with the external surface of the insulator in which the fitting member provides engagement of the insulator with the wall portion of the pressurizable tank which defines the opening of the tank, and a bracket secured to the antenna to prevent movement of the antenna in a direction toward the interior of the tank.

100. The seal of claim 99 in which the fitting member is integral with the wall portion of the tank.

101. The seal of claim 85 including a fitting member having an internal surface for engagement about the external surface of the insulator, in which the fitting member provides securing engagement of the insulator to the wall portion of the pressurizable tank which defines the opening in the tank, a recess defined by one of (a) a surface of the antenna, and (b) the interior surface of the insulator, and a tab extending from the other of (a) the surface of the antenna, and (b) the interior surface of the insulator which defines the recess, said tab positioned within the recess to secure the insulator to the antenna.

102. The seal of claim 101 including another recess defined by one of (c) the external surface of the insulator, and (d) the internal surface of the fitting member.

103. The seal of claim 102 including another tab extending from the other of (c) the external surface of the insulator, and (d) the internal surface of the fitting member, said other tab positioned within the other recess to secure the insulator to the fitting member.

104. The seal of claim 103 in which the fitting member is integral with the wall portion of the tank.

105. The seal of claim 85 including a fitting member having an internal surface for engagement about the external surface of the insulator, in which the fitting member provides securing engagement of the insulator to the wall portion of the pressurizable tank which defines the opening of the tank, and a securement member which engages the fitting member and engages at least one of (a) the insulator, and (b) the insulator and antenna for maintaining at least one of (a) and (b) from moving in a direction through the opening toward the interior of the tank.

106. A seal for an opening of a pressurizable tank defined by a wall portion of the tank, said tank containing desiccant for drying gas which passes through the desiccant, an elongate antenna for carrying microwave energy to the desiccant for regeneration of the desiccant which projects from an interior portion of the tank through the opening to an exterior portion of the tank, the seal comprising:

an insulator having an interior surface which defines an open space for receiving engagement with the antenna at the opening of the tank;

said insulator having an external surface opposing the interior surface of the insulator;

a fitting member for engagement about the external surface of the insulator, said fitting member having an internal surface which defines another open space for receiving engagement with the external surface of the insulator member, said fitting member having an exterior surface for securing engagement with the wall portion of the pressurizable tank which defines the opening;

a channel in communication with the internal surface of the fitting member and the external surface of the insulator; and a gasket positioned within the channel such that the gasket engages the external surface of the insulator and the internal surface of the fitting member.

107. The seal of claim 106 in which the gasket is constructed of a resilient material.

108. The seal of claim 106 in which the resilient material is elastomeric.

109. The seal of claim 106 in which the gasket is constructed of a ceramic material.

110. The seal of claim 106 in which the thickness of the gasket exceeds the depth of the channel.

111. The seal of claim 106 in which the channel is formed within a body of the insulator and extends along the external surface of the insulator.

112. The seal of claim 111 in which the channel surrounds the insulator and the gasket surrounds the insulator.

113. The seal of claim 112 in which the gasket engages a portion of the internal surface of the fitting member which is generally parallel to a longitudinal axis of the fitting member.

114. The seal of claim 106 in which the channel is formed within a body of the fitting member and extends along the internal,surface of the fitting member.

115. The seal of claim 114 in which the channel surrounds the external surface of the insulator and the gasket surrounds the external surface of the insulator with the internal surface of the fitting member engaging the external surface of the insulator.

116. The seal of claim 115 in which the gasket engages a portion of the external surface of the insulator which is generally parallel to the longitudinal axis of the insulator.

117. The seal of claim 106 in which the fitting member is integral with the wall portion of the tank defining the opening of the tank.

118. The seal of claim 106 in which the fitting member includes an external surface for providing engagement with the wall portion of the tank which defines the opening.

119. The seal of claim 106 in which a portion of interior surface of the insulator defines a shape which is tapered such that a distance between opposing portions of the interior surface of the insulator reduces as the insulator extends in a direction through the opening toward the exterior of the tank for receiving engagement with the antenna, the antenna engaging the interior surface of the insulator having a cross section dimension which recedes in size as the antenna extends in the direction through the opening toward the exterior of the tank, and an external surface of the insulator which opposes the interior surface of the insulator in which the external surface is positioned between the interior surface of the insulator and the wall portion of the pressurizable tank which defines the opening of the tank.

120. The seal of claim 106 including a channel in communication with the antenna and the interior surface of the insulator, and a gasket positioned within the channel such that the gasket engages the antenna and the interior surface of the insulator with the antenna engaging the interior surface of the insulator.

121. The seal of claim 106 including a bracket secured to the antenna to prevent movement of the antenna in a direction toward the interior of the tank.

122. The seal of claim 106 including a recess defined by one of (a) a surface of the antenna, and (b) the interior surface of the insulator, and a tab extending from the other of (a) the surface of the antenna, and (b) the interior surface of the insulator which defines the recess, said tab positioned within the recess to secure the insulator to the antenna.

123. The seal of claim 122 including another recess defined by one of (c) the external surface of the insulator, and (d) the internal surface of the fitting member.

124. The seal of claim 123 including another tab extending from the other of (c) the external surface of the insulator and (d) the internal surface of the fitting member, said other tab positioned within the other recess to secure the insulator to the fitting member.

125. The seal of claim 122 in which the fitting member is integral with the wall portion of the tank.

126. The seal of claim 106 including a securement member which engages the fitting member and engages at least one of (a) the insulator, and (b) the insulator and antenna for maintaining at least one of (a) and (b) from moving in a direction through the opening toward the interior of the tank.

127. The seal of claim 126 in which the fitting member is integral with the wall portion of the tank.

128. A seal for a pressurizable tank which contains desiccant for drying gas which is passed through the desiccant, in which a wall portion of the tank defines an opening through which an elongate antenna for carrying microwave energy to the desiccant for regeneration of the desiccant projects from an interior portion of the tank through the opening to an exterior portion of the tank, comprising:

an insulator for engagement about the antenna at a position along the antenna at the opening of the tank, said insulator having an interior surface engaging the antenna and an external surface which engages a fitting member;

said fitting member having an internal surface for engagement with the external surface of the insulator and said fitting member having an exterior surface for securing engagement with the wall portion of the pressurizable tank which defines the opening of the tank; and a bracket secured to the antenna to prevent movement of the antenna in the direction toward the interior of the tank.

129. The seal of claim 128 in which the bracket includes a channel.

130. The seal of claim 129 in which the channel encloses at least a portion of the antenna.

131. The seal of claim 128 in which the bracket is secured to the antenna with a screw positioned through the bracket.

132. The seal of claim 128 in which the bracket is secured to the antenna with a clip.

133. The seal of claim 128 in which the antenna is spaced apart from the bracket, and an attachment member interposed between the antenna and the bracket is secured to both the antenna and the bracket.

134. The seal of claim 128 in which the bracket is secured to the tank.

135. The seal of claim 128 including a portion of the interior surface of the insulator defining a shape which is tapered such that a distance between opposing portions of the interior surface of the insulator reduces as the insulator extends in a direction through the opening toward the exterior of the tank for receiving engagement with the antenna, and a tapered portion of the antenna having a cross section dimension which reduces in size as the antenna extends in the direction through the opening toward the exterior of the tank in which the tapered portion of the antenna engages the interior surface of the insulator, and said external surface of the insulator is positioned between the interior surface of the insulator and the wall portion of the pressurizable tank which defines the opening of the tank.

136. The seal of claim 128 including a channel in communication with the antenna and the interior surface of the insulator, and a gasket positioned within the channel such that the gasket engages the antenna and the interior surface of the insulator with the antenna engaged with the interior surface of the insulator.

137. The seal of claim 128 including a channel in communication with the internal surface of the fitting member and the external surface of the insulator, and a gasket positioned within the channel such that the gasket engages the external surface of the insulator and the internal surface of the fitting member.

138. The seal of claim 137 in which the fitting member is integral with the wall portion of the pressurizable tank that defines the opening.

139. The seal of claim 128 including a recess defined by one of (a) a surface of the antenna, and (b) the interior surface of the insulator, and a tab extending from the other of (a) the surface of the antenna, and (b) the interior surface of the insulator which defines the recess, said tab positioned within the recess to secure the insulator to the antenna.

140. The seal of claim 139 including another recess defined by one of (c) the external surface of the insulator, and (d) the internal surface of the fitting member.

141. The seal of claim 140 including another tab extending from the other of (c) the external surface of the insulator, and (d) the internal surface of the fitting member, said other tab positioned within the other recess to secure the insulator to the fitting member.

142. The seal of claim 139 in which the fitting member is integral with the wall portion of the tank.

143. The seal of claim 128 including a securement member which engages the fitting member and engages at least one of (a) the insulator, and (b) the insulator and the antenna for maintaining at least one of (a) and (b) from moving in a direction through the opening toward the interior of the tank.

144. The seal claim 143 in which the fitting member is integral with the wall portion of the tank.

145. A seal for a pressurizable tank which contains desiccant for drying gas which is passed through the desiccant, in which an opening is defined by a wall portion of the tank through which an elongate antenna for carrying microwave energy to the desiccant for regeneration of the desiccant projects from an interior portion of the tank through the opening to an exterior portion of the tank, comprising:

an insulator having an interior surface and an external surface, said interior surface engages the antenna at the opening of the tank;

a fitting member having an internal surface for engagement about the external surface of the insulator, said fitting member having an exterior surface for securing engagement with the wall portion of the pressurizable tank which defines the opening of the tank;

a recess defined by one of (a) a surface of the antenna, and (b) the interior surface of the insulator; and a tab extending from the other of (a) the surface of the antenna, and (b) the interior surface of the insulator, said tab positioned within the recess to secure the insulator to the antenna.

146. The seal of claim 145 including another recess defined by one of (c) the external surface of the insulator, and (d) the internal surface of the fitting member.

147. The seal of claim 145 including another tab extending from the other of (c) the external surface of the insulator, and (d) the internal surface of the fitting member, which defines the other recess, said other tab positioned within the other recess to secure the insulator to the fitting member.

148. The seal of claim 145 in which the fitting member is integral with the wall portion of the tank which defines the opening of the tank.

149. The seal of claim 145 in which the fitting member has an exterior surface for securing engagement with the wall portion of the tank which defines the opening of the tank.

150. The seal of claim 145 including a portion of the interior surface of the insulator defines a shape which is tapered such that a distance between opposing portions of the interior surface of the insulator reduces as the insulator extends in a direction through the opening toward the exterior of the tank for receiving engagement with the antenna, a portion of the antenna engaging the interior surface of the insulator having a cross section dimension which reduces in size as the antenna extends in the direction through the opening toward the exterior of the tank, and the external surface of the insulator is positioned between the interior surface of the insulator and the wall portion of the pressurizable tank which defines the opening of the tank.

151. The seal of claim 145 including a channel in communication with the antenna and the interior surface of the insulator, and a gasket positioned within the channel such that the gasket engages the antenna and the interior surface of the insulator, with the antenna engaged with the interior surface of the insulator.

152. The seal of claim 145 including a channel in communication with the internal surface of the fitting member and the external surface of the insulator, and a gasket positioned within the channel such that the gasket engages the external surface of the insulator and the internal surface of the fitting member.

153. The seal of claim 152 in which the fitting member is integral with the wall portion of the tank.

154. The seal of claim 145 including a bracket secured to the antenna to prevent movement of the antenna in the direction toward the interior of the tank.

155. The seal of claim 145 including a securement member which engages the fitting member and engages at least one of (a) the insulator, and (b) the insulator and the antenna for maintaining at least one of (a) and (b) from moving in a direction through the opening toward the interior of the tank.

156. A seal for a pressurizable tank which contains desiccant for drying gas which is passed through the desiccant, in which an opening is defined by a wall portion of the tank through which an elongate antenna for carrying microwave energy to the desiccant for regeneration of the desiccant projects from an interior portion of the tank through the opening to the exterior portion of the tank, comprising:
- an insulator having an interior surface and an external surface, said interior surface engages the antenna at the opening of the tank;
- a fitting member having an internal surface for engagement about the external surface of the insulator, said fitting member having an exterior surface for securing engagement with the wall portion of the pressurizable tank which defines the opening of the tank; and
- a securement member which engages the fitting member and engages at least one of (a) the insulator, and (b) the antenna for maintaining at least one of (a) the insulator, and (b) the antenna from moving in a direction through the opening toward the interior of the tank.

157. The seal of claim 156 in which the fitting member is integral with the sidewall portion of the tank which defines the opening.

158. The seal of claim 156 in which the fitting member has an exterior surface for securing the fitting member to the wall portion of the pressurizable tank which defines the opening of the tank.

159. The seal of claim 156 in which the securement member includes a pin member which extends through a portion of the fitting member and at least through a portion of the insulator.

160. The seal of claim 159 in which the pin member extends into at least a portion of the antenna.

161. The seal of claim 160 in which the pin member extends substantially through the fitting member, insulator and the antenna.

162. The seal of claim 156 in which the securement member includes a set screw extending through at least a portion of the fitting member and engaging the insulator.

163. The seal of claim 162 in which the set screw extends through at least a portion of the insulator and engages the antenna.

164. The seal of claim 156 including a gasket member positioned between the fitting member and the insulator in which the securement member is positioned spaced apart from the gasket member away from the interior of the tank.

165. The seal of claim 156 including a gasket member positioned between the insulator and the antenna in which the securement member engages the insulator and the antenna and is positioned spaced apart from the gasket member away from the interior of the tank.

166. The seal of claim 156 in which a portion of the interior surface of the insulator defines a shape which is tapered such that a distance between opposing portions of the interior surface of the insulator reduces as the insulator extends in a direction through the opening toward the exterior of the tank for receiving engagement with the antenna,
- a portion of the antenna has a cross section dimension which reduces in size as the antenna extends in the direction through the opening toward the exterior of the tank in which the portion of the antenna engages the portion of the interior surface of the insulator, and
- the external surface of the insulator is positioned between the interior surface of the insulator and the wall portion of the pressurizable tank which defines the opening of the tank.

167. The seal of claim 156 including
- a channel in communication with the antenna and the interior surface of the insulator, and
- a gasket positioned within the channel such that the gasket engages the antenna and the interior surface of the insulator with the antenna engaged with the interior surface of the insulator.

168. The seal of claim 156 including
- a channel in communication with the internal surface of the fitting member and the external surface of the insulator, and
- a gasket positioned within the channel such that the gasket engages the external surface of the insulator and the internal surface of the fitting member.

169. The seal of claim 156 including
- a bracket secured to the antenna to prevent movement of the antenna in the direction toward the interior of the tank.

170. The seal of claim 156 including
- a recess defined by one of (a) a surface of the antenna, and (b) the interior surface of the insulator, and
- a tab extending from the other of (a) the surface of the antenna, and (b) the interior surface of the insulator which defines the recess, said tab positioned within the recess to secure the insulator to the antenna.

171. The seal of claim 170 including another recess defined by one of (c) the external surface of the insulator, and (d) the internal surface of the fitting member.

172. The seal of claim 171 including another tab extending from the other of (c) the external surface of the insulator, and (d) the internal surface of the fitting member, which defines the other recess, said other tab member positioned within the other recess to secure the insulator to the fitting member.

173. A seal for an opening defined by a wall portion of a pressurizable tank, said tank contains desiccant for drying a gas passed through the desiccant in which an elongate antenna for carrying microwave energy to the desiccant for regeneration of the desiccant extends from an interior portion of the tank through the opening to an exterior portion of the tank, comprising:
- an insulator having an interior surface for receiving engagement with the antenna proximate to the opening of the tank;
- said interior surface of the insulator adheres to the antenna; and
- an external surface of the insulator which is positioned between the interior surface of the insulator and the wall portion of the pressurizable tank which defines the opening of the tank.

174. The seal of claim 173 including an adhesive compound positioned between and in contact with the interior surface of the insulator and the antenna for securing the insulator to the antenna.

175. The seal of claim 173 in which the insulator is at least partly constructed of a moldable material in which the moldable material of the insulator adheres to the antenna.

176. A method for holding an elongate antenna in position during pressurization of a pressurizable tank, said tank containing desiccant for drying a gas passed through the desiccant, said antenna extends through an opening defined by a wall portion of the tank from an exterior portion to an interior portion of the tank, said antenna used for receiving microwave energy to regenerate the desiccant in the tank, comprising the steps of:

engaging a tapered portion of the antenna with a corresponding tapered portion of an interior surface of an insulator; and positioning an external surface of the insulator between the interior surface of the insulator and the wall portion of the pressurizable tank which defines the opening of the tank.

177. The method of claim 176 including the step of positioning the tapered portion of the interior surface of the insulator within the opening of the tank such that a distance between opposing portions of the interior surface reduces as the insulator extends in a direction through the opening toward an exterior of the tank.

178. The method of claim 177 in which the tapered portion of the interior surface of the insulator forms a truncated cone.

179. The method of claim 177 including the step of positioning the tapered portion of the antenna within the opening of the tank such that the tapered portion has a cross section which reduces in size as the antenna extends in the direction through the opening toward the exterior of the tank.

180. The method of claim 179 including the step of engaging a fitting member with the external surface of the insulator.

181. The method of claim 180 including the step of engaging an exterior surface of the fitting member with the wall portion of the pressurizable tank defining the opening of the tank.

182. The method of claim 181 including the step of positioning the external surface of the insulator within the opening of the tank such that a distance between opposing portions of the external surface reduces as the insulator extends in the direction through the opening toward the exterior of the tank.

183. The method of claim 182 in which the internal surface of the fitting member forms a truncated cone.

184. The method of claim 183 including the step of surrounding the external surface of the insulator, with the internal surface of the fitting member.

185. The method of claim 179 including the steps of placing a channel in communication with the antenna and the interior surface of the insulator, and positioning a gasket within the channel such that the gasket engages the antenna and the interior surface of the insulator.

186. The method of claim 185 including the steps of forming the channel within a body of the insulator, extending the channel along the interior surface of the insulator, and positioning the gasket to surround the antenna.

187. The method of claim 185 including the steps of forming the channel within a body of the antenna, extending the channel along the surface of the antenna, and positioning the gasket to surround the antenna.

188. The method of claim 179 including the steps of placing a channel in communication with the internal surface of the fitting member and the external surface of the insulator, and positioning a gasket within the channel such that the gasket engages the external surface of the insulator and the internal surface of the fitting member.

189. The method of claim 188 including the steps of forming the channel within a body of the insulator, extending the channel along the external surface of the insulator, and positioning the gasket to surround the insulator.

190. The method of claim 187 including the steps of forming the channel within a body of the fitting member, extending the channel along the internal surface of the fitting member, and positioning the gasket to surround the external surface of the insulator.

191. A method for holding an elongate antenna in position during depressurization of a pressurizable tank, said tank containing desiccant for drying a gas passed through the desiccant, said antenna extends through an opening defined by a wall portion of the tank from an exterior portion to an interior portion of the tank, said antenna used for receiving microwave energy to regenerate the desiccant in the tank, the method comprising the steps of:

positioning the antenna in a direction through the opening of the tank;

engaging the antenna with an interior surface of an insulator at a position proximate the opening of the tank; and holding the antenna by securement which is generally transverse to the direction of the elongate antenna to prevent movement of the antenna in a direction toward an interior of the tank.

192. The method of claim 191 in which the step of holding includes the step of securing a bracket to the antenna to prevent movement of the antenna in the direction through the opening toward the interior of the tank.

193. The movement of claim 192 including the step of positioning a sidewall of the bracket, which is spaced apart from the antenna, in a direction generally parallel to the direction of the antenna.

194. The method of claim 193 including the step of securing a transverse sidewall of the bracket, which is generally transverse to the sidewall of the bracket, to the antenna.

195. The method of claim 194 including the step of mounting a lower portion of the sidewall to the tank to limit movement of the bracket.

196. The method of claim 191 including the step of engaging an internal surface of a fitting member about an external surface of the insulator, engaging the fitting member with the wall portion of the tank which defines the opening of the tank, and engaging a securement member with the fitting member and at least one of (a) the insulator, and (b) the insulator and the antenna for maintaining at least one of (a) and (b) from moving in the direction through the opening toward the interior of the tank.

197. The method of claim 196 in which the securement member includes a pin and including the step of laterally extending the pin into engagement with the fitting member, the insulator and the antenna.

198. The method of claim 196 in which the securement member includes a set screw and including the step of laterally extending the set screw into engagement with the fitting member, the insulator and the antenna.

199. The method of claim 191 including the steps of engaging a fitting member about an external surface of the insulator, engaging the fitting member with the wall portion of the tank defining the opening, establishing a recess in one of (a) the antenna, and (b) the interior surface of the insulator, and positioning a tab, extending from the other of (a) and (b), within the recess to secure the insulator to the antenna.

200. The method of claim 199 including the steps of establishing another recess defined, by one of (c) an external surface of the insulator, and (d) an internal surface of the fitting member, and positioning another tab, extending from the other of (c) and (d), within the other recess to secure the insulator to the fitting member.

201. A method for holding an elongate antenna in position during pressurization and depressurization of a pressurizable tank, said tank containing desiccant for drying a gas passed through the desiccant, said antenna extends through an opening defined by a wall portion of the tank from an exterior portion to an interior portion of the tank, said antenna used for receiving microwave energy to regenerate the desiccant in the tank, the method comprising the steps of:

adhering an insulator to the antenna;

positioning the antenna through the opening in the tank and positioning the insulator proximate to the opening; and securing the insulator to the tank.

202. The method of claim 201 in which the step of adhering includes the step of positioning an adhering compound between an interior surface of the insulator and the antenna.

203. The method of claim 201 in which the step of adhering includes the steps of utilizing a moldable material for constructing the insulator and molding the moldable material of the insulator to the antenna.

* * * * *